(12) United States Patent
Glass et al.

(10) Patent No.: US 10,532,867 B2
(45) Date of Patent: Jan. 14, 2020

(54) GIFT CARD PRESENTATION DEVICES

(71) Applicant: Gift Card Impressions, LLC, Kansas City, MO (US)

(72) Inventors: Brett R. Glass, Kansas City, MO (US); Nicole E. Glass, Kansas City, MO (US)

(73) Assignee: Gift Card Impressions, LLC, Kansas City, MO (US)

( * ) Notice: Subject to any disclaimer, the term of this patent is extended or adjusted under 35 U.S.C. 154(b) by 65 days.

(21) Appl. No.: 15/665,060

(22) Filed: Jul. 31, 2017

(65) Prior Publication Data

US 2017/0327287 A1    Nov. 16, 2017

Related U.S. Application Data

(60) Continuation of application No. 15/431,535, filed on Feb. 13, 2017, which is a division of application No. 14/181,668, filed on Feb. 15, 2014, now Pat. No. 9,565,911.

(60) Provisional application No. 61/765,594, filed on Feb. 15, 2013.

(51) Int. Cl.
| | | |
|---|---|---|
| *B65D 73/00* | (2006.01) | |
| *B65D 27/04* | (2006.01) | |
| *B65D 27/22* | (2006.01) | |
| *B65D 27/00* | (2006.01) | |
| *G06Q 20/38* | (2012.01) | |
| *A45C 11/18* | (2006.01) | |
| *G07F 17/00* | (2006.01) | |
| *G06K 19/06* | (2006.01) | |
| *G06Q 99/00* | (2006.01) | |
| *G09F 23/10* | (2006.01) | |
| *G06Q 20/34* | (2012.01) | |

(52) U.S. Cl.
CPC .......... *B65D 73/0078* (2013.01); *A45C 11/18* (2013.01); *B65D 27/00* (2013.01); *B65D 27/04* (2013.01); *B65D 27/22* (2013.01); *G06K 19/06028* (2013.01); *G06Q 20/387* (2013.01); *G06Q 99/00* (2013.01); *G07F 17/00* (2013.01); *G09F 23/10* (2013.01); *B65D 2203/00* (2013.01); *G06Q 20/354* (2013.01)

(58) Field of Classification Search
CPC .... B65D 73/0078; B65D 27/00; B65D 85/00; B65D 81/365; A45C 11/18; B42D 15/045; G07F 17/00; G06Q 20/387
USPC ....... 206/449, 484, 775, 769, 39; 40/124.19; 229/125.125
See application file for complete search history.

(56) References Cited

U.S. PATENT DOCUMENTS

| 312,421 A | * | 2/1885 | Bauer | ................ B65D 5/48038 |
| | | | | 229/120.36 |
| 5,067,609 A | * | 11/1991 | Stout | .................... B65D 5/4204 |
| | | | | 206/216 |
| 6,092,932 A | * | 7/2000 | Pekala | ................... A45C 13/42 |
| | | | | 206/575 |

(Continued)

*Primary Examiner* — Chun Hoi Cheung
(74) *Attorney, Agent, or Firm* — Landmark Intellectual Property Law, PLLC

(57) ABSTRACT

The disclosed invention relates generally to various embodiments of holders and packaging for giving gifts. In particular, the invention relates to various gift card holders that hold a gift card and enhance the presentation and gift giving experience for recipients and gift givers alike. The holders and packing also permit a gift card disposed therein to be visible, scanned, accessed, or otherwise activated without removing the gift card from the holder.

7 Claims, 21 Drawing Sheets

(56) References Cited

U.S. PATENT DOCUMENTS

| | | | | |
|---|---|---|---|---|
| 6,732,459 B1* | 5/2004 | Clark | ............... | B42D 15/045 206/308.1 |
| 6,877,263 B2* | 4/2005 | Clark | ............... | B42D 15/045 206/308.1 |
| 8,443,967 B2* | 5/2013 | Glass | ............... | B42F 7/02 206/39 |
| 8,950,656 B2* | 2/2015 | Nebeker | ............... | B65D 5/322 220/62 |
| 2009/0107862 A1* | 4/2009 | Pascua | ............... | B65D 75/14 206/232 |
| 2013/0186782 A1* | 7/2013 | Doyle | ............... | B65D 75/14 206/232 |
| 2013/0220878 A1* | 8/2013 | Glass | ............... | B65D 5/10 206/756 |
| 2014/0090995 A1* | 4/2014 | Hahn | ............... | B65D 73/00 206/307 |
| 2014/0216982 A1* | 8/2014 | Boyer | ............... | B65D 85/00 206/758 |

* cited by examiner

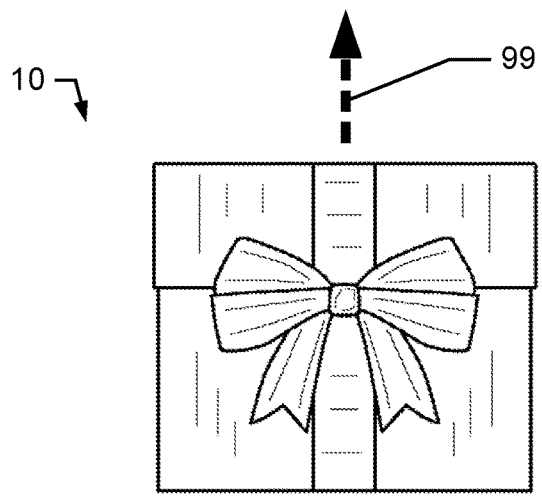
FIG. 1A
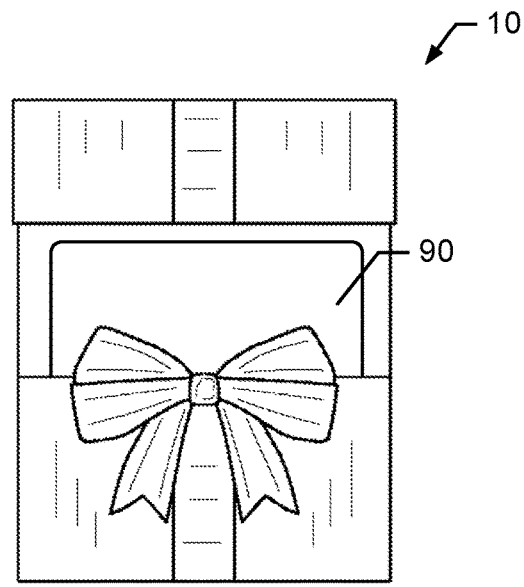
FIG. 1B
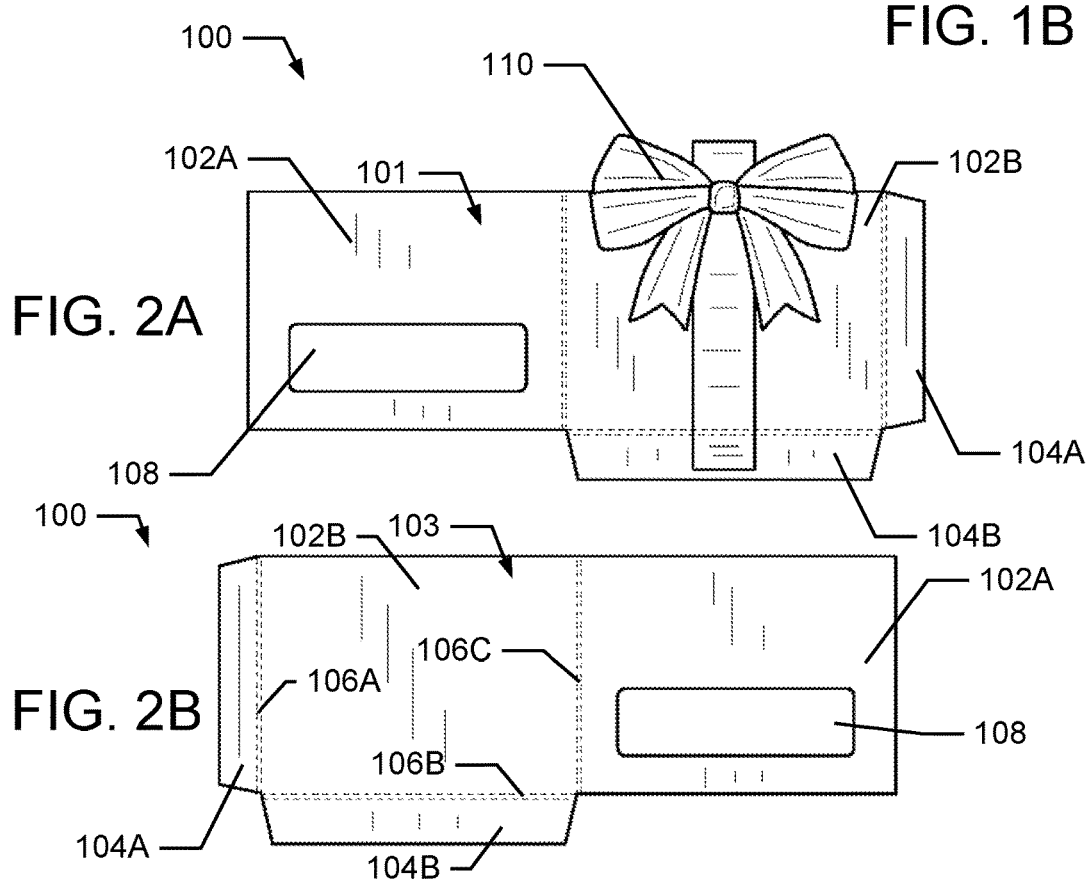
FIG. 2A
FIG. 2B

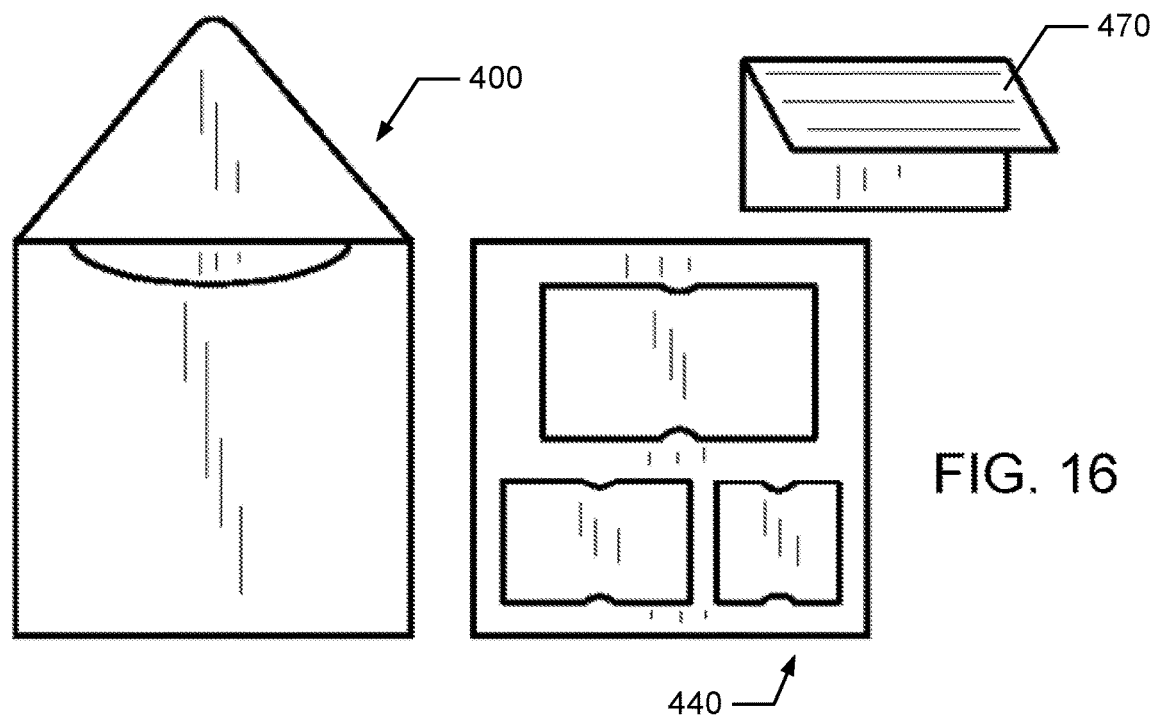
FIG. 16
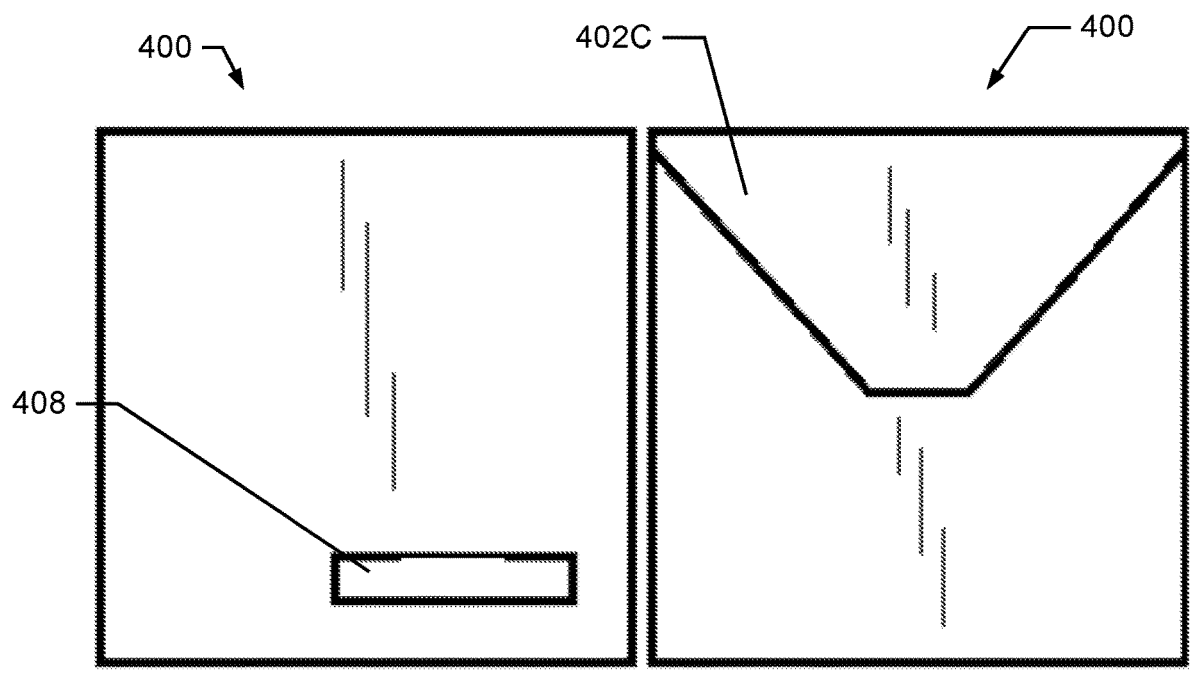
FIG. 17A
FIG. 17B

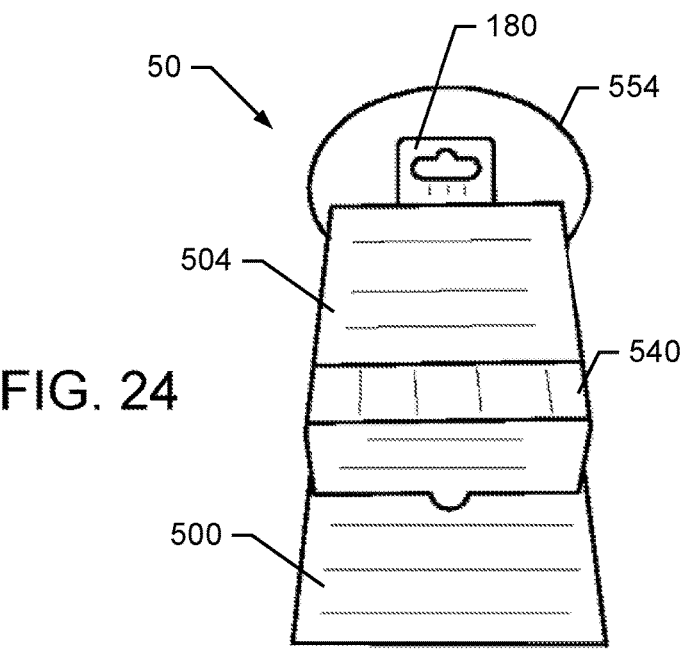
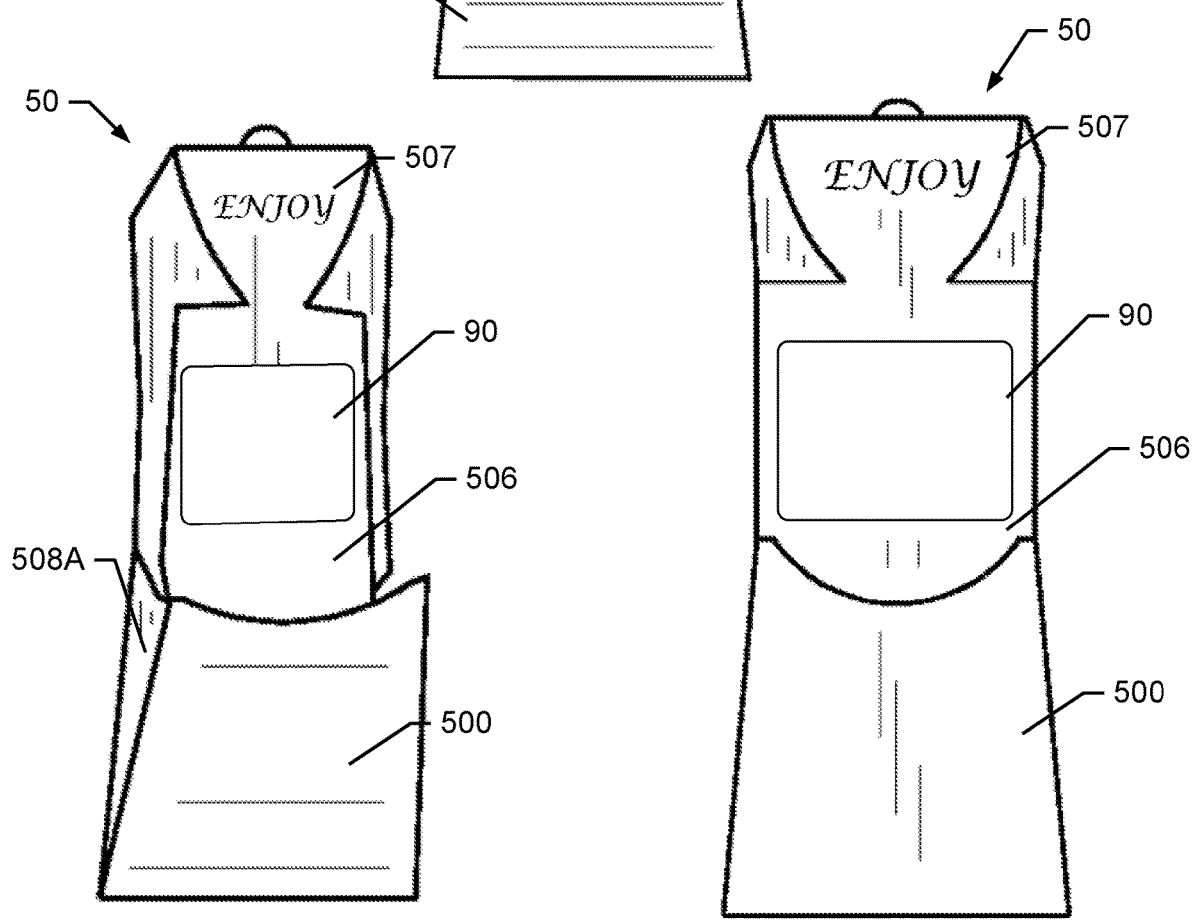

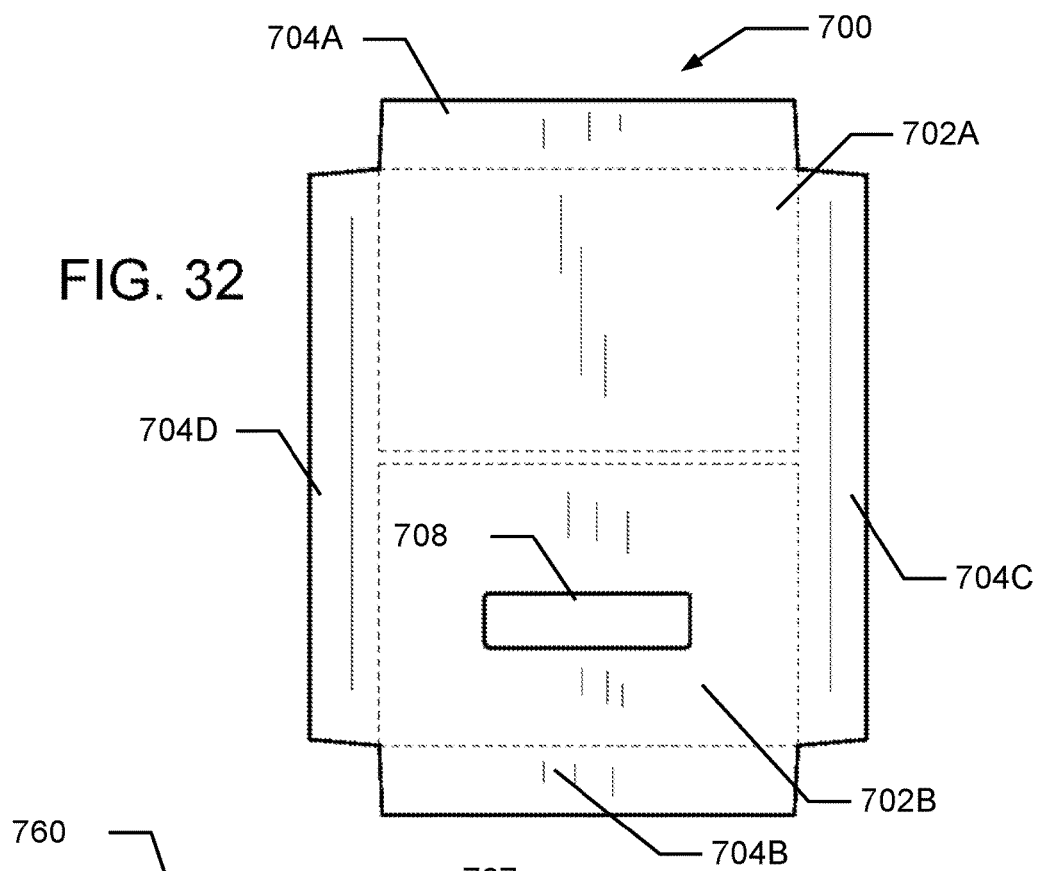
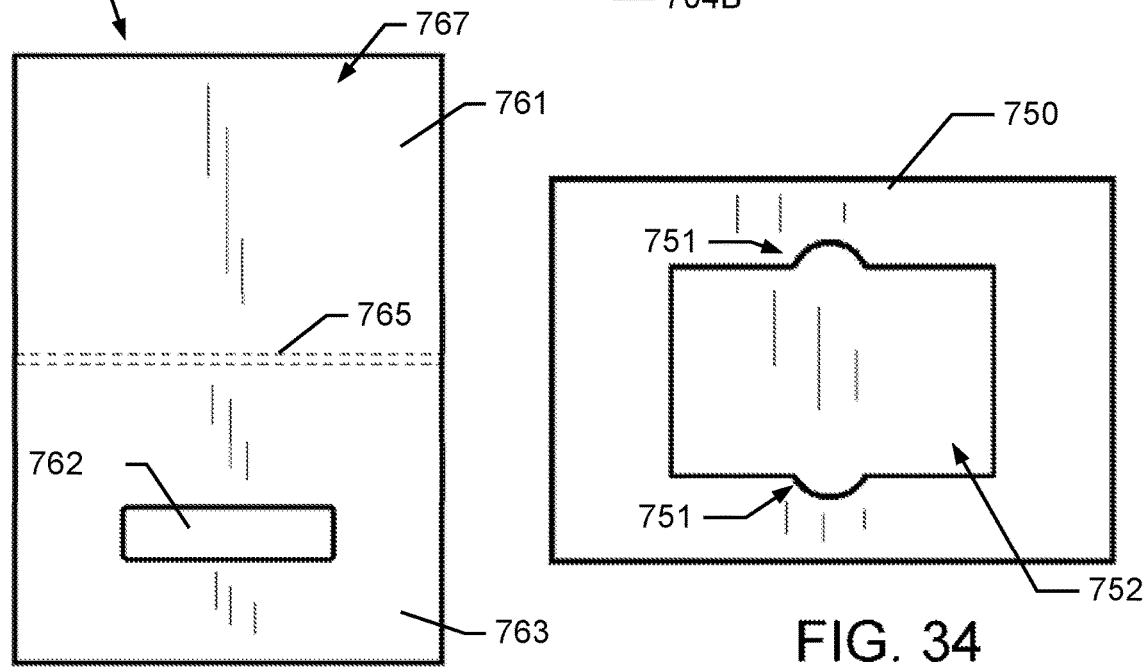
FIG. 32
FIG. 33
FIG. 34

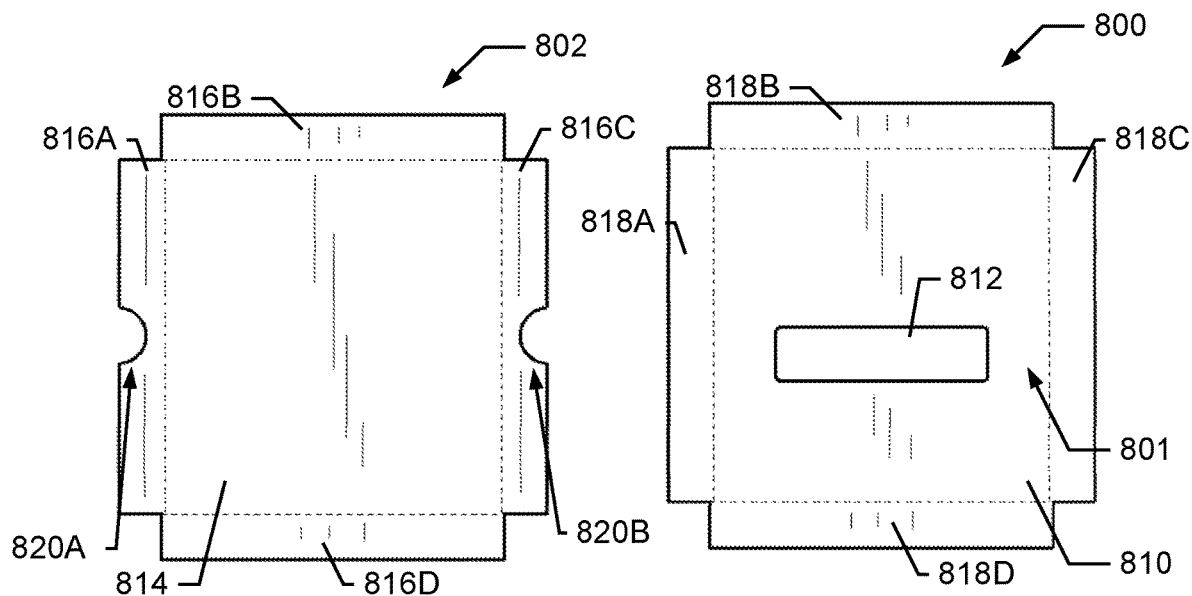
FIG. 40A
FIG. 40B
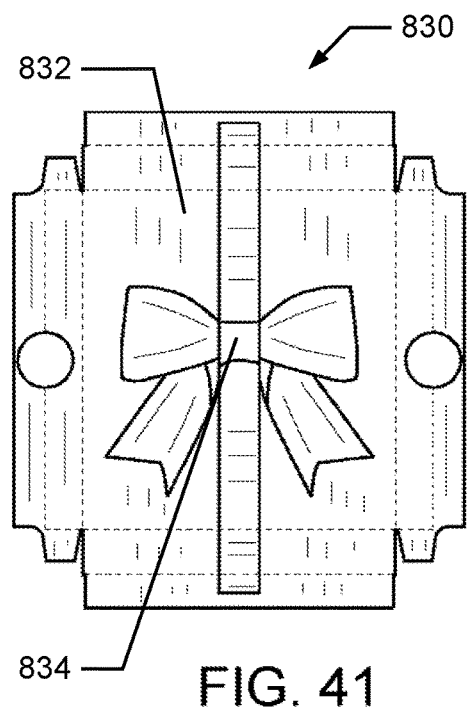
FIG. 41
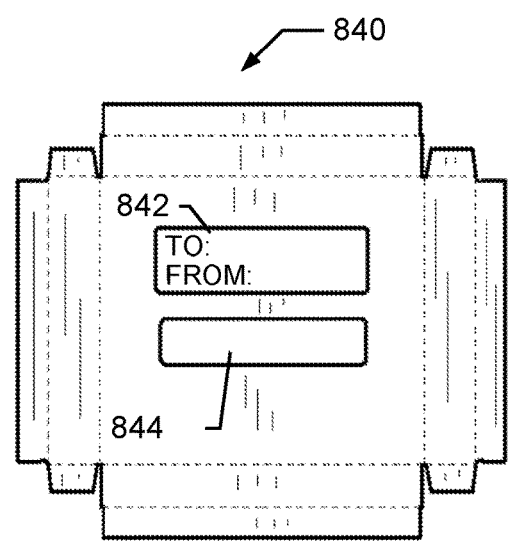
FIG. 42

GIFT CARD PRESENTATION DEVICES

CROSS-REFERENCE TO RELATED APPLICATIONS

This application is a Continuation of U.S. Non-provisional application Ser. No. 15/431,535, entitled "Gift Card Presentation Devices," filed Feb. 13, 2017, which is a Divisional of and claims priority to U.S. Non-provisional application Ser. No. 14/181,668, entitled "Gift Card Presentation Devices," filed Feb. 15, 2014, now U.S. Pat. No. 9,565,911, which claims priority to U.S. Provisional Application No. 61/765,594, filed Feb. 15, 2013, entitled "Gift Card Presentation Devices," the entire contents of which are hereby incorporated herein by reference.

BACKGROUND

Transaction cards, stored value cards, or gift cards are popular gifts. Gift cards typically comprise a stored value card whereby a certain cash equivalent value is encoded upon a magnetic strip applied to the surface of the card. This stored value may be determined by the vendor prior to packaging and display for sale or may be selected at the point of sale by the purchaser and loaded by the cashier using a magnetic card reader/writer. Although popular, gift cards are typically provided with a generic and impersonal design. In addition, gift cards are often given in simple un-adorned envelopes or impersonal sleeves. This may minimize the gift giving experience and emotional value for both gift giver and the recipient.

Therefore, a need exists for a gift card holder that provides graphical and/or mechanical enhancements to entertain the gift card recipient and add emotional and personal value to the gift and the gift giver.

SUMMARY

This invention relates generally to gift card holders and more particularly to a device for holding a gift card or gift card packet while providing graphical and mechanical enhancements to entertain the gift card recipient and add value to the gift giving experience for the gift giver. In addition, the gift card holders are suitable for convenient display and activation by retailers. Specifically, the gift card holders include one or more cutouts that provide easy access to view and scan a barcode or other indicia on the gift cards for activation.

In one embodiment, a gift card holder includes a pocket portion having at least one cutout, and an insert portion for receiving a gift card. The insert portion also includes at least one other cutout. The insert portion is slidably engaged to the pocket portion such that the gift card is concealed within the pocket portion when the insert is fully inserted. In addition, the cutouts of the pocket portion and the insert portion are aligned so that a barcode or other indicia on the gift card may be viewed when the card is inserted into the pocket portion. In various aspects, the pocket portion and insert may be configured and adorned to resemble a gift box or gift bag.

In another embodiment, a gift card holder includes a pocket portion having a front, a back with at least one cutout, and a flap. The holder also includes an insert portion for receiving a gift card. The insert portion includes at least one opening for receiving the gift card, at least one opening for receiving a photograph, and at least one cutout. When the insert portion is inserted into the pocket portion, the at least one cutout is aligned so that a barcode or other indicia on the gift card may be viewed when the card is inserted into the pocket portion. In one aspect, the insert portion includes an easel attachment, so that the insert portion may be used as a photo frame.

In one embodiment, the gift card holder includes a planar material that is folded to form a pocket portion and a gift card panel. The pocket portion includes a front, a back having at least one cutout, and a flap, while the gift card panel is configured to receive a gift card. The gift card panel also includes at least one cutout. The gift card panel is slidably inserted into the pocket portion such that the cutouts are aligned so that a barcode or other indicia on the gift card may be viewed when the gift card panel is inserted into the pocket portion. In one aspect, the pocket portion includes one or more gusset panels. In another aspect, the pocket portion forms a box shape.

In one embodiment, the gift card holder is a planar material folded to form a bi-fold having a top portion and a bottom portion with at least one cutout. The holder also includes a frame affixed to the bottom portion. A gift card may be received within the frame and the top portion may be folded towards the bottom portion such that a front surface of the top portion is positioned proximate to a front surface of the bottom portion when the holder is in a closed configuration. In one aspect, the holder may also include an outer sleeve that also has a cutout such that the cutouts are aligned so that a barcode or other indicia on the gift card may be viewed when the bi-fold is inserted into the sleeve. The bi-fold holder may also include a band that encircles the holder to hold it in the closed configuration.

In one embodiment, the gift card holder is a box having a bottom portion with at least one cutout and a lid portion. The box also includes a tray positioned within the bottom portion. The tray receives a gift card and includes at least one cutout. The exterior of the box is covered in one or more decorative liners that also include at least one cutout, such that all of the cutouts are aligned so that a barcode or other indicia on the gift card may be viewed when the box is closed.

In various other embodiments the pocket portion or sleeve and insert portions may be dimensioned such that they are at least twice the height and/or twice the width of a typical gift card. In addition, the insert may also include one or more pull tabs for removing the insert from the pocket portion or sleeve.

Details of one or more implementations are set forth in the accompanying drawings and the description below. Other features and advantages may be apparent from the description and drawings, and from the claims.

BRIEF DESCRIPTION OF THE DRAWINGS

FIGS. 1A and 1B are front plan views of a simulated present gift card holder in a closed and open configuration, respectively, according to one embodiment.

FIGS. 2A and 2B are plan views of an exterior surface and an interior surface, respectively, of an unassembled pocket portion of a simulated present gift card holder according to one embodiment.

FIG. 16 is a diagram of various components of a photo frame gift card holder according to one embodiment.

FIGS. 17A and 17B are a rear plan view and a front plan view, respectively, of an assembled envelope portion of a frame gift card holder according to one embodiment.

FIG. 24 is a plan view of a revealing gift card holder according to one embodiment.

FIGS. 25A and 25B are a perspective view and a plan view, respectively, of a revealing gift card holder according to one embodiment.

FIG. 32 is a plan view of an exterior surface of an outer sleeve portion of a bi-fold gift card holder according to one embodiment.

FIG. 33 is a plan view of a backer panel for a bi-fold insert portion of a bi-fold gift card holder according to one embodiment.

FIG. 34 is a plan view of a front frame portion for a bi-fold insert portion of a bi-fold gift card holder according to one embodiment.

FIGS. 40A and 40B are plan views of a lid and bottom portion, respectively, of a gift box gift card holder in an unassembled configuration according to one embodiment.

FIG. 41 is a plan view of a decorative lid cover for a lid portion of a gift box gift card holder in an unassembled configuration according to one embodiment.

FIG. 42 is a plan view of a decorative bottom cover for a bottom portion of a gift box gift card holder in an unassembled configuration according to one embodiment.

DETAILED DESCRIPTION

Figures 3A, 3B:
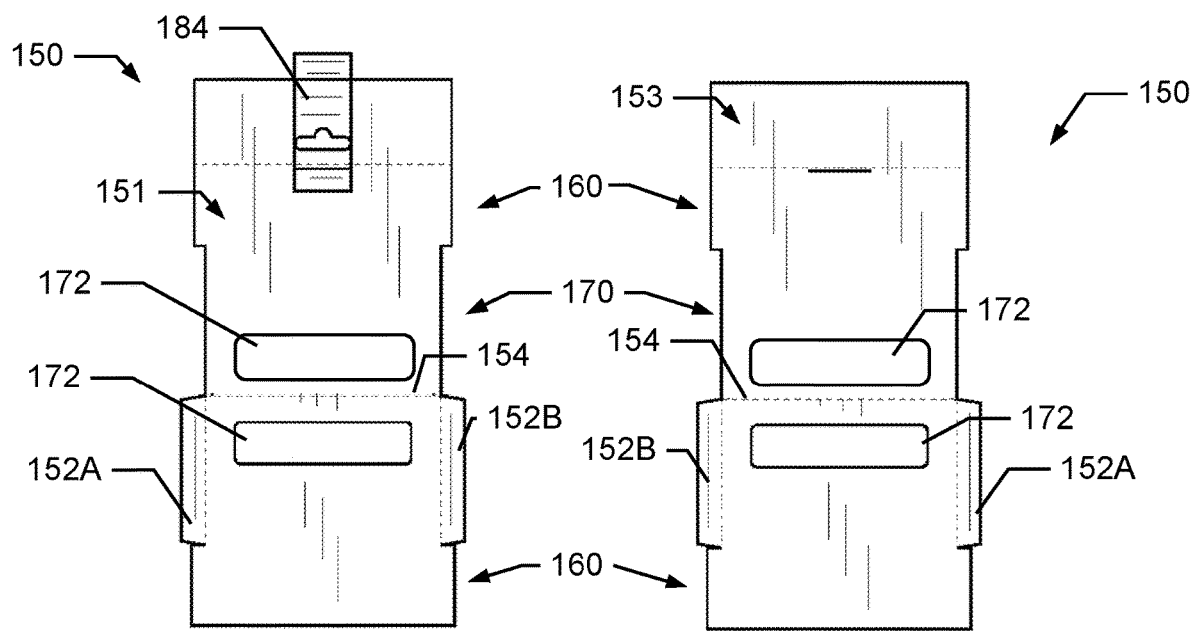
FIGS. 3A and 3B are plan views of an exterior surface and an interior surface, respectively, of an unassembled insert portion of a simulated present gift card holder according to one embodiment.

The present invention relates to gift card holders that enhance the gift giving experience for both the gift giver and the gift recipient. The gift card holders disclosed herein also provide benefits to retailers. For example, the gift cards and gift card holders may be received by retailers in pre-assembled packaging. In addition, gift card holders allow the gift cards to be purchased and activated without removing them from the gift card holders. In various aspects, the gift card holders of the present invention include a number of decorative and functional features that allow a gift giver to add personalization and other enhancements when giving a gift card.

Simulated Present Gift Card Holders

FIGS. 1A-6 depict one embodiment of a simulated present gift card holder 10 having a pocket portion 100 and a removable gift card insert 150. In one aspect, the pocket portion 100 is formed by cutting and folding a generally planar material, such as but not limited to paper, cardstock, paperboard, or cardboard. The planar material has an exterior surface 101, shown in FIG. 2A, and an interior surface 103, shown in FIG. 2B. The surfaces 101 and 103 may be printed, painted, or otherwise marked with graphics or indicia. In one aspect, the planar material is cut to form two generally rectangular portions 102A-B and tabs 104A-B. The rectangular portions 102A-B and the tabs 104A-B are defined and separated by one or more folds 106A-C. The pocket portion 100 is folded along fold 106C to position the interior surface of the rectangular portion 102A proximal to and facing the interior surface of the rectangular portion 102B. An adhesive is applied to the tabs 104A-B which are then affixed to the interior surface of rectangular portion 102A, thereby forming a pocket that is open along the side opposite the tab 104B. The rectangular portion 102A includes a cutout or opening 108. The cutout 108 allows a barcode, including matrix or two-dimensional barcodes and/or other indicia, including alphanumeric text, on a gift card positioned within the pocket to be viewed and scanned without removing the gift card from the pocket portion 100. The pocket portion 100 may also include additional indicia and adornments, such as a bow 110 or indicia to identify the gift giver and recipient.

The removable gift card insert 150, shown in FIGS. 3A and 3B, is also made from a planar material that is marked with indicia on the exterior surface 151 or the interior surface 153. The insert 150 is formed by cutting and folding along fold 154 to bring the interior surfaces of the insert 150 into close proximity to each other. An adhesive is applied to the tabs 152A-B that are folded inward to hold the folded insert together.

The folded planar material has a top insert portion 160 and a bottom insertion portion 170. In one aspect, the top insert portion 160 is wider than the bottom insert portion 170. Once the insert 150 is assembled, the bottom insert portion is received into the pocket portion 100, as shown in FIG. 1A-B. Once inserted, the gift card holder 10 has the appearance of a wrapped present. Translating the insert portion 150 away from the pocket portion 100, as indicated by 99, simulates the opening of a present to reveal the gift card.

The bottom insert portion also has one or more cutouts 172 that align with the cutout 108 and allow a barcode or other indicia on a gift card attached to the insert 150 to be viewed and scanned when the insert is positioned within the pocket 100. A gift card may then be attached to the marked surface of the bottom insert portion 170. The top insert portion 160 may include additional features, including a removable tab 180 for displaying the gift card holder 10 at a retail location, a tag 182 for identifying the gift giver and recipient, and additional adornments including a ribbon 184, which may be passed through a slot cut into the top portion.

FIGS. 7A-9B depict another embodiment of a simulated present gift card holder 20 having a pocket portion 200 and a slidable gift card insert 250. In one aspect, a pocket portion 200 is formed by cutting and folding a generally planar material, such as but not limited to paper, cardstock, paperboard, or cardboard. The planar material has an exterior surface 201, shown in FIG. 8A, and an interior surface 203, shown in FIG. 8B. The surfaces 201 and 203 may be printed, painted, or otherwise marked with graphics or indicia. In one aspect, the planar material is cut to form two generally trapezoidal portions 202A-B and tabs 204A-B. The trapezoidal portions 202A-B and the tabs 204A-B are defined and separated by one or more folds 206A-C. In one aspect, the trapezoidal portions are shaped and marked to resemble a shopping bag; however, other shapes and markings may also be used. The pocket portion 200 is folded along fold 206C to position the interior surface of the trapezoidal portion 202A proximal to and facing the interior surface of the trapezoidal portion 202B. An adhesive is applied to the tabs 204A-B which are then affixed to the interior surface of trapezoidal portion 202A, thereby forming a pocket that is open along a side opposite the tab 204B. The trapezoidal portion 202A includes a cutout or opening 208. The cutout 208 allows a barcode or other indicia on a gift card positioned within the pocket to be viewed and scanned without removing the gift card from the pocket portion 200 The pocket portion 200 may also include additional indicia and adornments, such as a bow 210 or indicia to identify the gift giver and recipient.

Figures 7A, 7B:
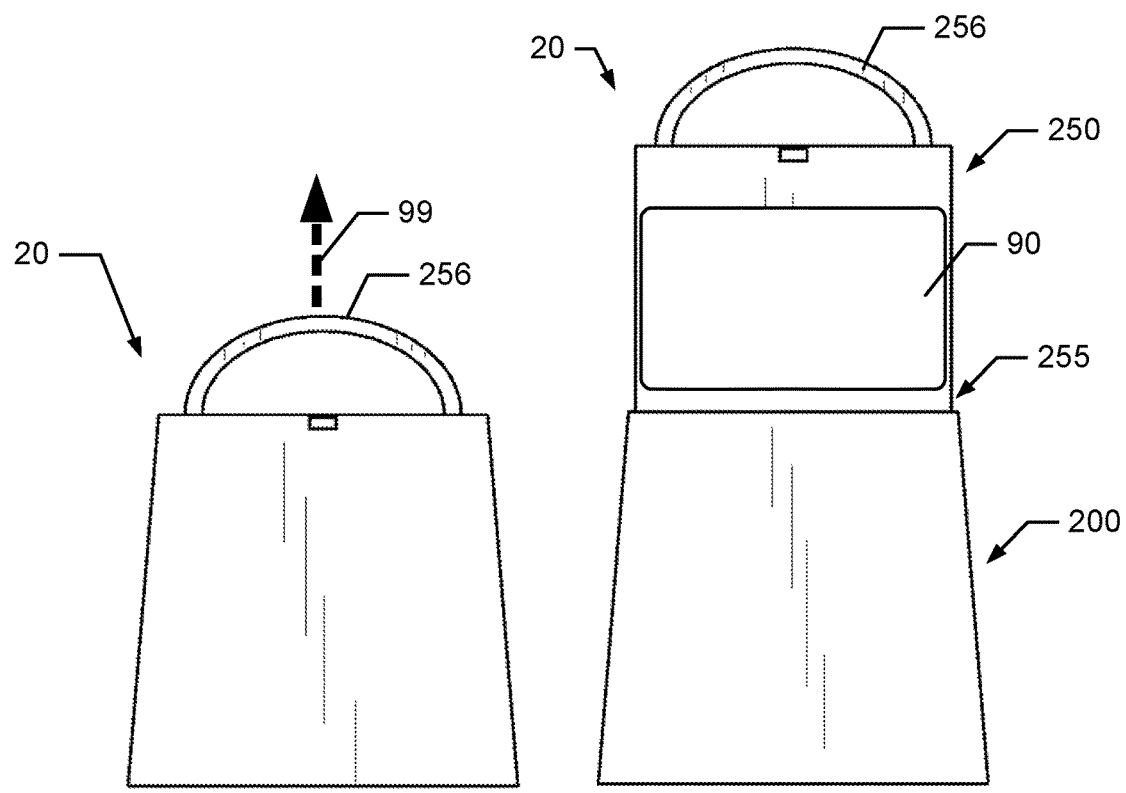
FIGS. 7A and 7B are front plan views of a simulated present gift card holder in a closed and open configuration, respectively, according to one embodiment.
Figures 8A, 8B:
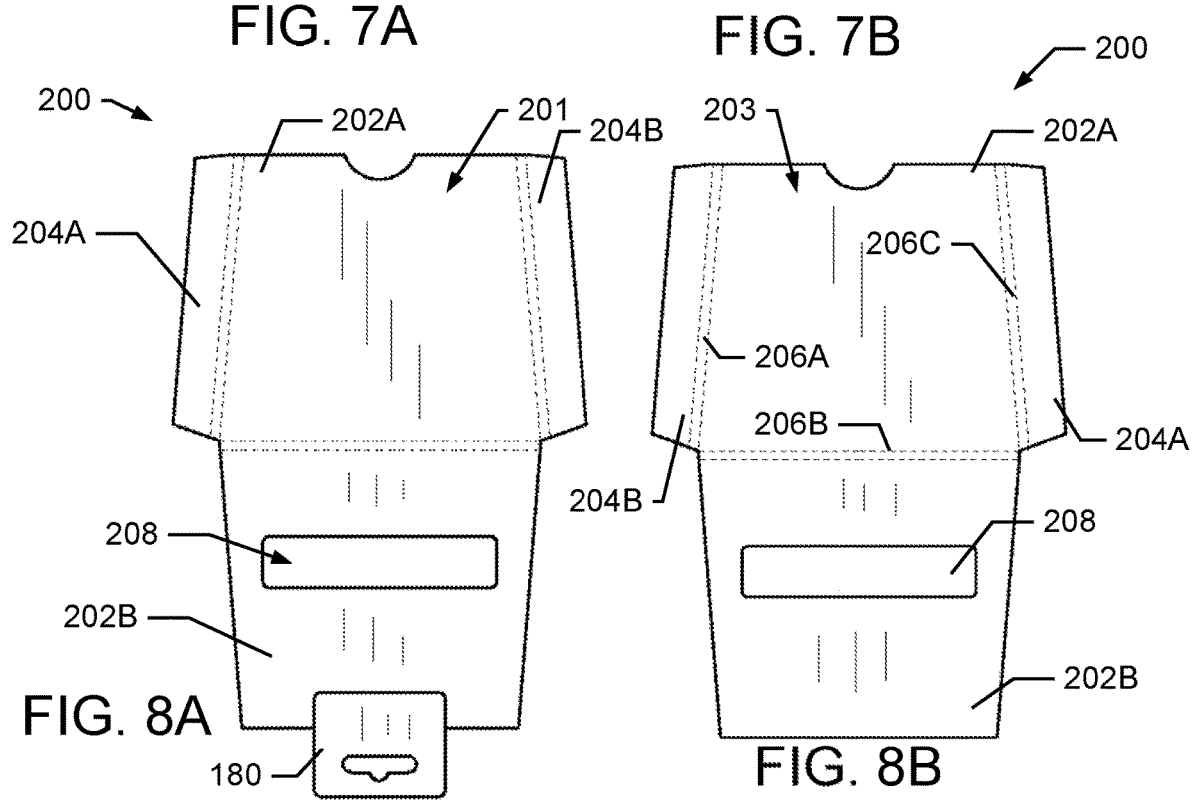
FIGS. 8A and 8B are plan views of an exterior surface and an interior surface, respectively, of an unassembled pocket portion of a simulated present gift card holder according to one embodiment.
Figures 9A, 9B:
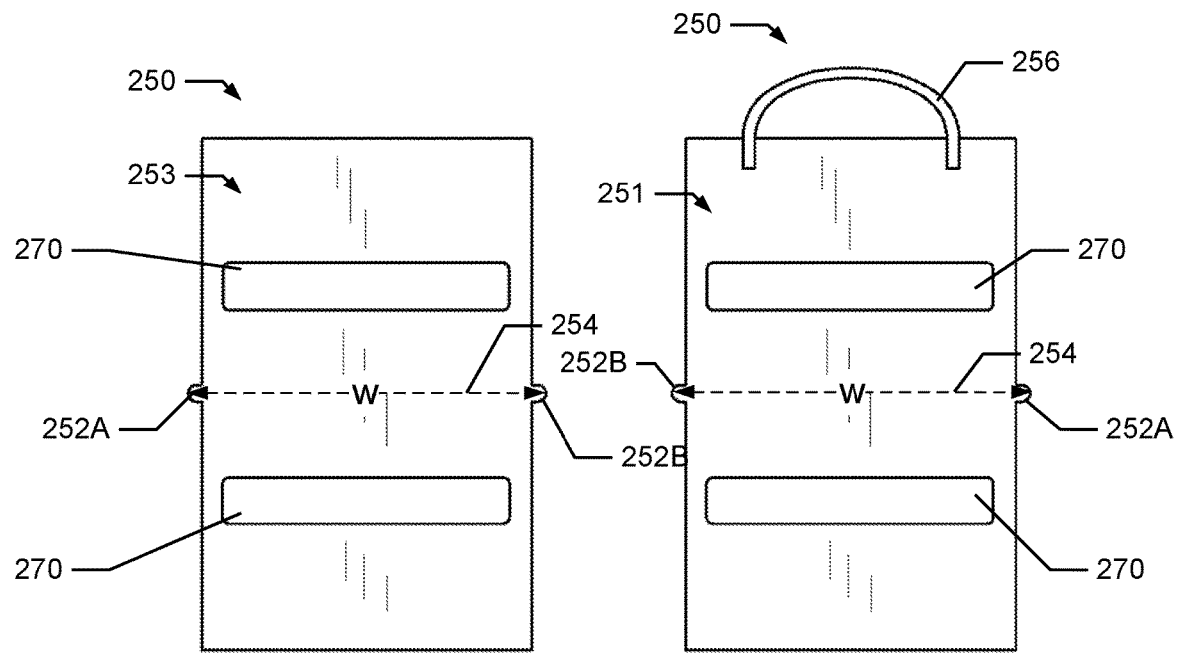
FIGS. 9A and 9B are plan views of an interior surface and an exterior surface, respectively, of an unassembled insert portion of a simulated present gift card holder according to one embodiment.
Figures 10A, 10B, 10C:
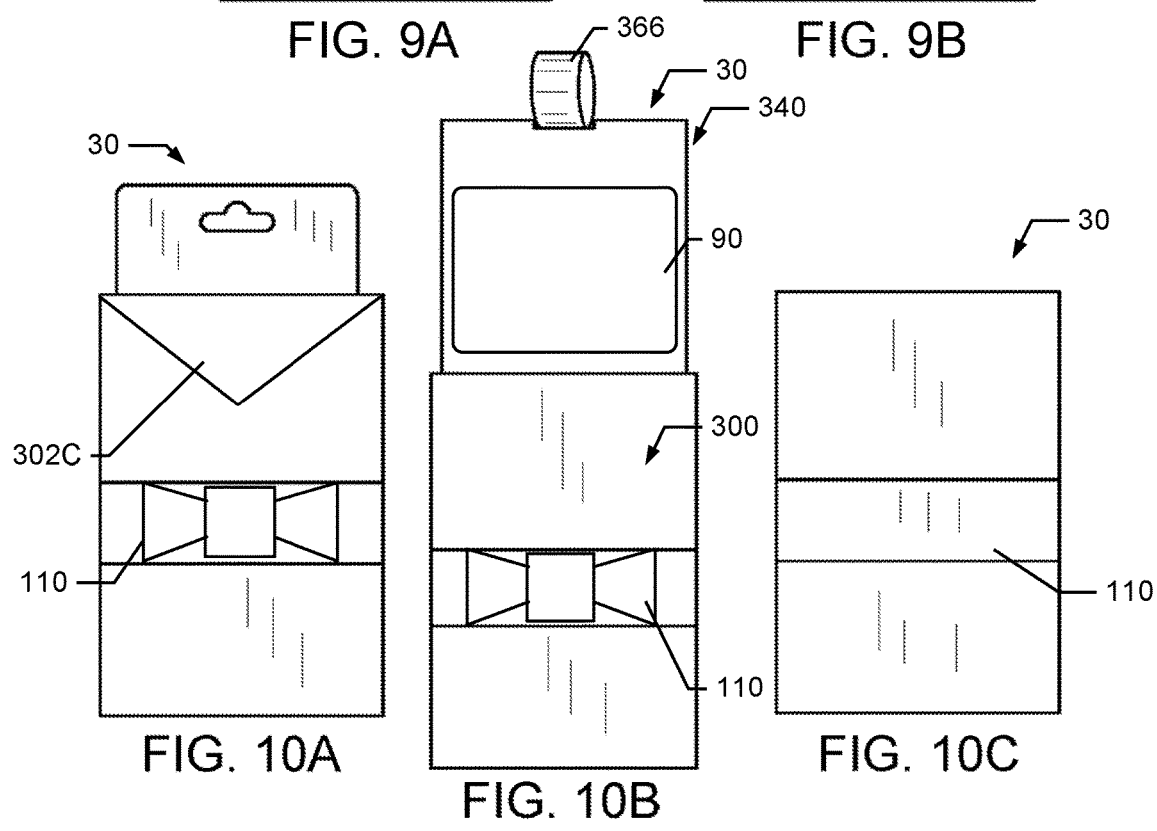
FIGS. 10A and 10B are front plan views of a slide-out gift card holder in a closed configuration and an open configuration, respectively, according to one embodiment.
FIG. 10C is a rear plan view of a slide-out gift card holder in a closed configuration according to one embodiment.
Figures 11A, 11B:
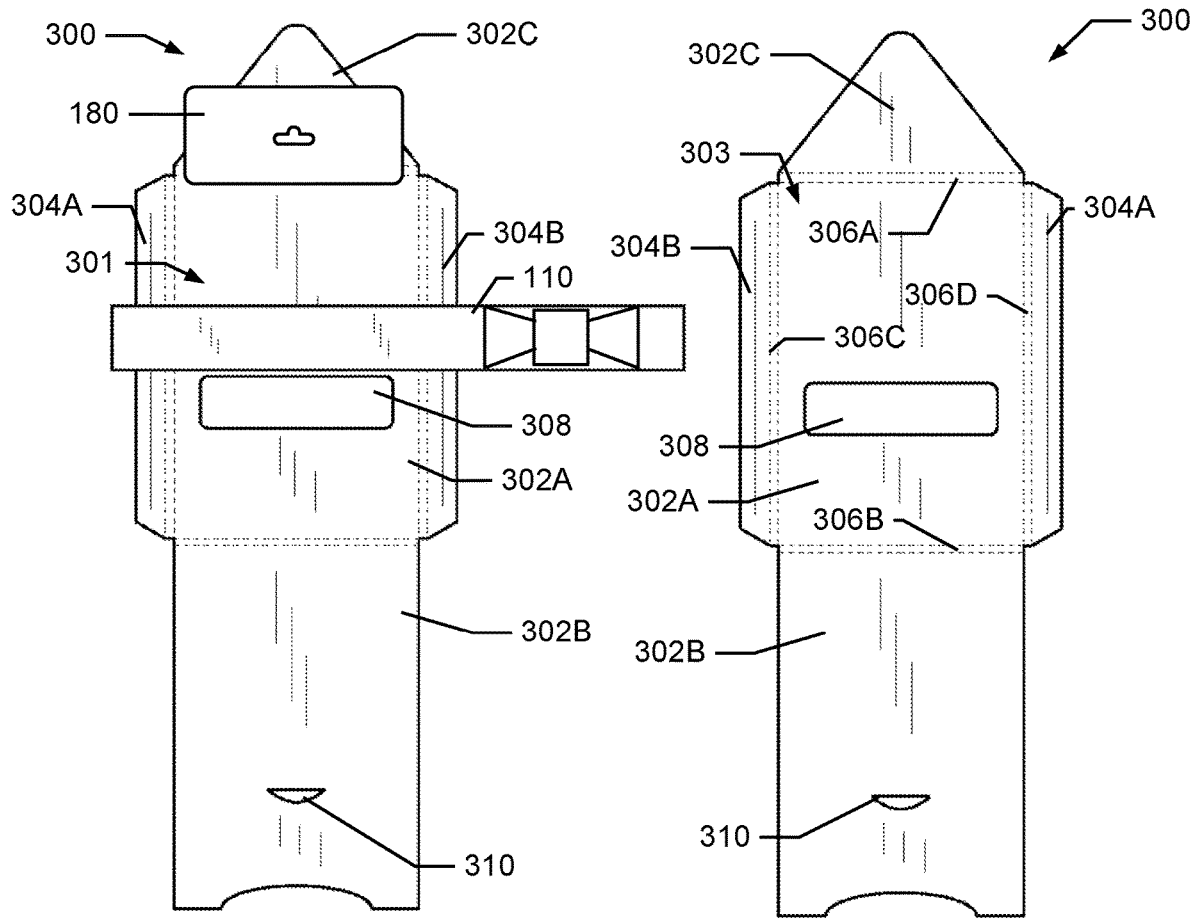
FIGS. 11A and 11B are plan views of an exterior surface and an interior surface, respectively, of an unassembled sleeve portion of a slide-out gift card holder according to one embodiment.
Figure 15:
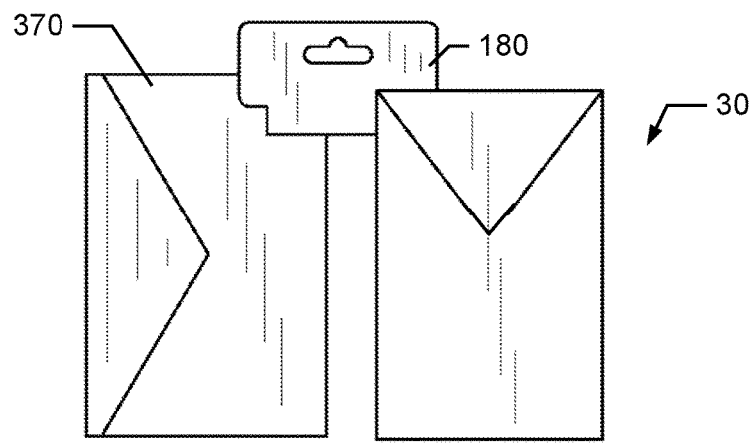
FIG. 15 is a plan view of a retail package for a slide-out gift card holder according to one embodiment.
Figure 12:
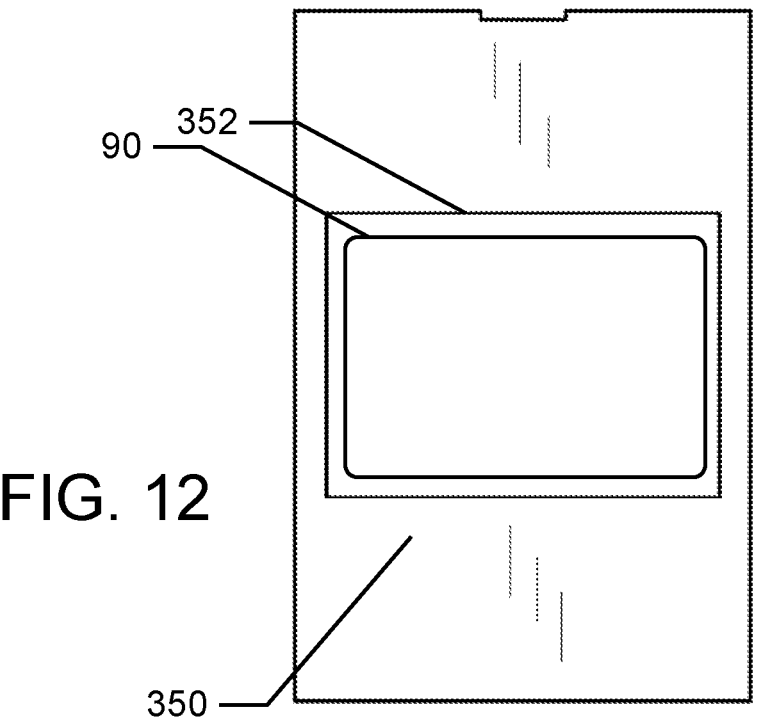
FIG. 12 is a plan view of an insert frame for a slide-out gift card holder according to one embodiment.
Figure 13:
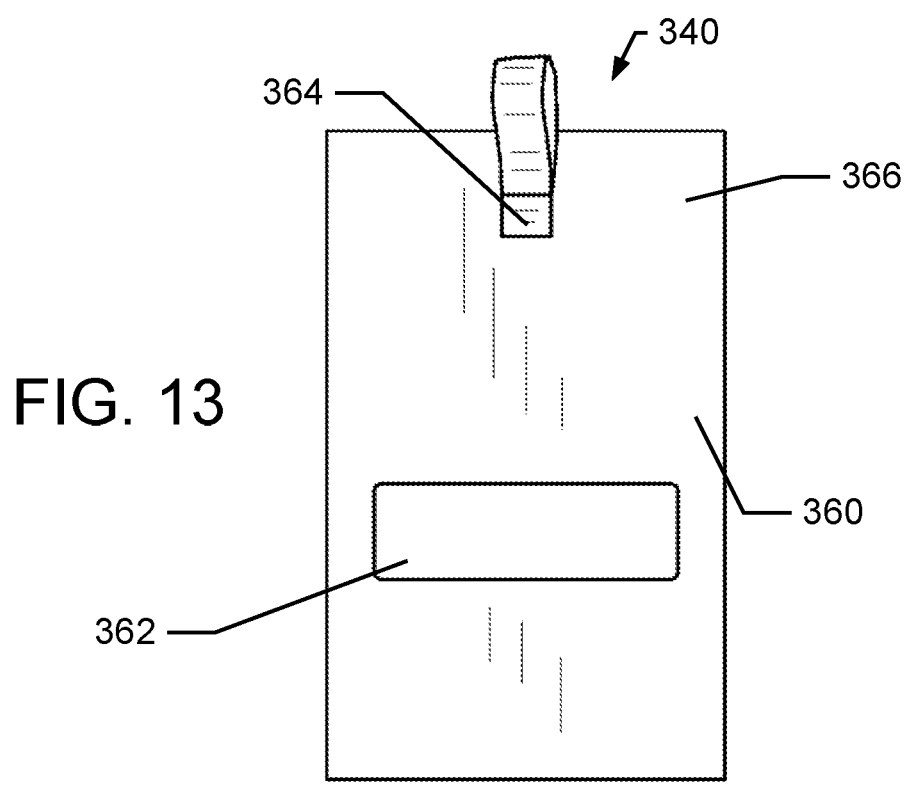
FIG. 13 is a plan view of an insert backer for a slide-out gift card holder according to one embodiment.

The slidable gift card insert 250, shown in FIGS. 9A and 9B, is also made from a planar material that is marked with indicia on the exterior surface 251 or the interior surface 253. The insert 250 is formed by cutting and folding along the fold 254 to bring the interior surfaces of the insert 250 into close proximity to each other thereby forming a two-layer insert with range-limiting tabs 252A-B. An adhesive is applied to the tabs 252A-B that are folded inward to hold the folded insert together. The insert 250 has one or more cutouts or openings 270 that align with the cutout 208 and allow a barcode or other indicia on a gift card attached to the insert 250 to be viewed and scanned when the insert is positioned within the pocket portion 200. In addition, the insert 250 may include additional adornments, such as a handle 256. The range limiting tabs 252A-B are dimensioned such that the width "W" of the insert 250 along the fold 254 and the latitudinal axis between the tabs is greater than the width of the upper portion 255 of the trapezoidal shaped pocket portion 200, as shown in FIG. 7B. As such, the range limiting tabs 252A-B prevent the insert 250 from being removed from the pocket portion 200 unintentionally. Translating the insert portion 250 away from the pocket portion 200, as indicated by 99 in FIG. 7A, simulates the opening of a gift bag to reveal the gift card 90.

Figures 4, 5:
FIGS. 4-6 are plan views of embodiments of adornments and accessories that may be used with the gift card holders disclosed herein.
Figure 6:
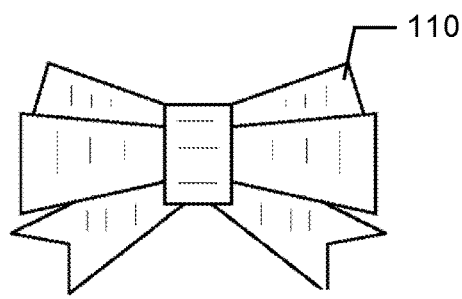

The gift card holder 20 may also include additional features, including a removable tab 180, shown in FIG. 4, for displaying the gift card holder at a retail location and a tag 182, shown in FIG. 5, for identifying the gift giver and recipient. Additional adornments including, but not limited to a ribbon, may be attached to the holder to enhance the appearance thereof.

Slide-Out Gift Card Holders

FIGS. 10A-15 are an embodiment of a slide-out gift card holder 30 having a sleeve portion 300 and a removable gift card insert 340. In one aspect, the sleeve portion 300 may be formed from cutting and folding a planar material 301, such as but not limited to paper, cardstock, paperboard, foil, or cardboard. One or more of the external surface 301 or the internal surface 303 of the planar material shown in FIG. 11A may be printed, painted, or otherwise marked with graphics or indicia. The planar material 301 is cut or scored to form a front portion 302A, a back portion 302B, and a flap 302C, as well as tabs 304A-B. In one aspect, the front and back portions 302A-B are dimensioned to have a height approximately greater that the height or width of a typical gift card, depending upon the orientation of the gift card within the holder 30 such that the gift card can be fully received within the sleeve portion. The front, back, and flap portions 302A-C, respectively, and the tabs 304A-B are defined and separated by one or more folds 306A-D. In addition, the back portion 302B includes a cutout or opening 308. The cutout 308 allows a barcode or other indicia on a gift card positioned within the sleeve to be viewed and scanned without removing the gift card from the sleeve portion 300. The sleeve portion 300 is formed by folding the planar material along folds 306A-B to position the interior surface of the front portion 302A proximal to and facing the interior surface of the back portion 302B. An adhesive is applied to the tabs 304A-B which are then affixed to the interior surface of rectangular portion 302B, thereby forming a sleeve that is opened at the end proximal to the flap 302C. The flap may be folded and inserted into a slot 310 that is cut into the front portion 302A to close the sleeve portion 300. The sleeve portion 300 may include additional indicia and adornments, such as an area to identify the gift giver and recipient or a ribbon and bow. In addition, the sleeve portion 300 may include a removable tab 180, as shown in FIG. 4, for displaying the slide-out gift card holder 30 at a retail location.

In one embodiment, the removable gift card insert 340 is made from two or more planar materials that are each marked with indicia or graphics on one or more surfaces thereof. The insert 340 is formed by cutting and the planar materials to fabricate a front frame 350 and a backer panel or board 360. The front frame 350 is affixed on top of a backer board 360. In particular, the front frame 350 is cut to create a generally rectangular opening 352 dimensioned to receive and hold a gift card 90, while that backer board 360 includes a cutout or opening 362 for viewing indicia on the gift card engaged to the insert 340. The cutout 362 aligns with the cutout 308 to allow a barcode or other indicia on the gift card placed within the frame opening 352 to be viewed and scanned when the insert 340 is positioned within the sleeve portion 300. The backer board 360 may include another cutout or opening 364 to receive a pull tab, which may be a looped ribbon 366 in one embodiment, for removing the insert 340 from the sleeve portion 300. In another embodiment, the frame 350 and the backer board 360 may be formed from a single planar material that is folded upon itself.

Figure 14A:
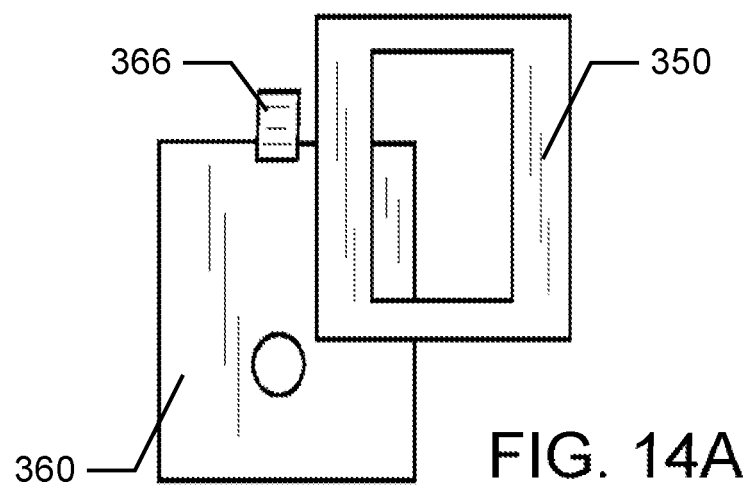
FIG. 14A is a diagram of the assembly of an insert for a slide-out gift card holder according to one embodiment.
Figure 14B:
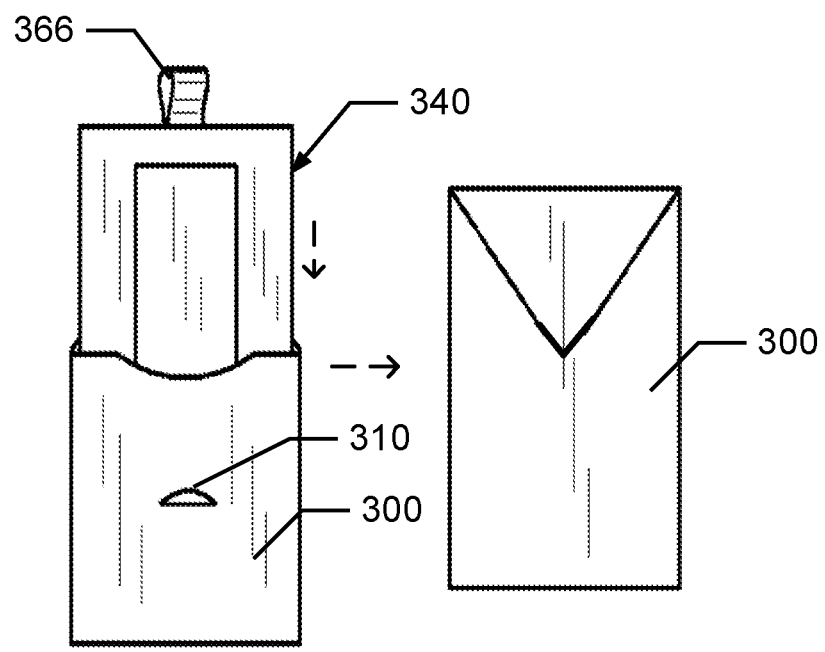
FIG. 14B is a diagram of the assembly of a slide-out gift card holder according to one embodiment.
Figure 18:
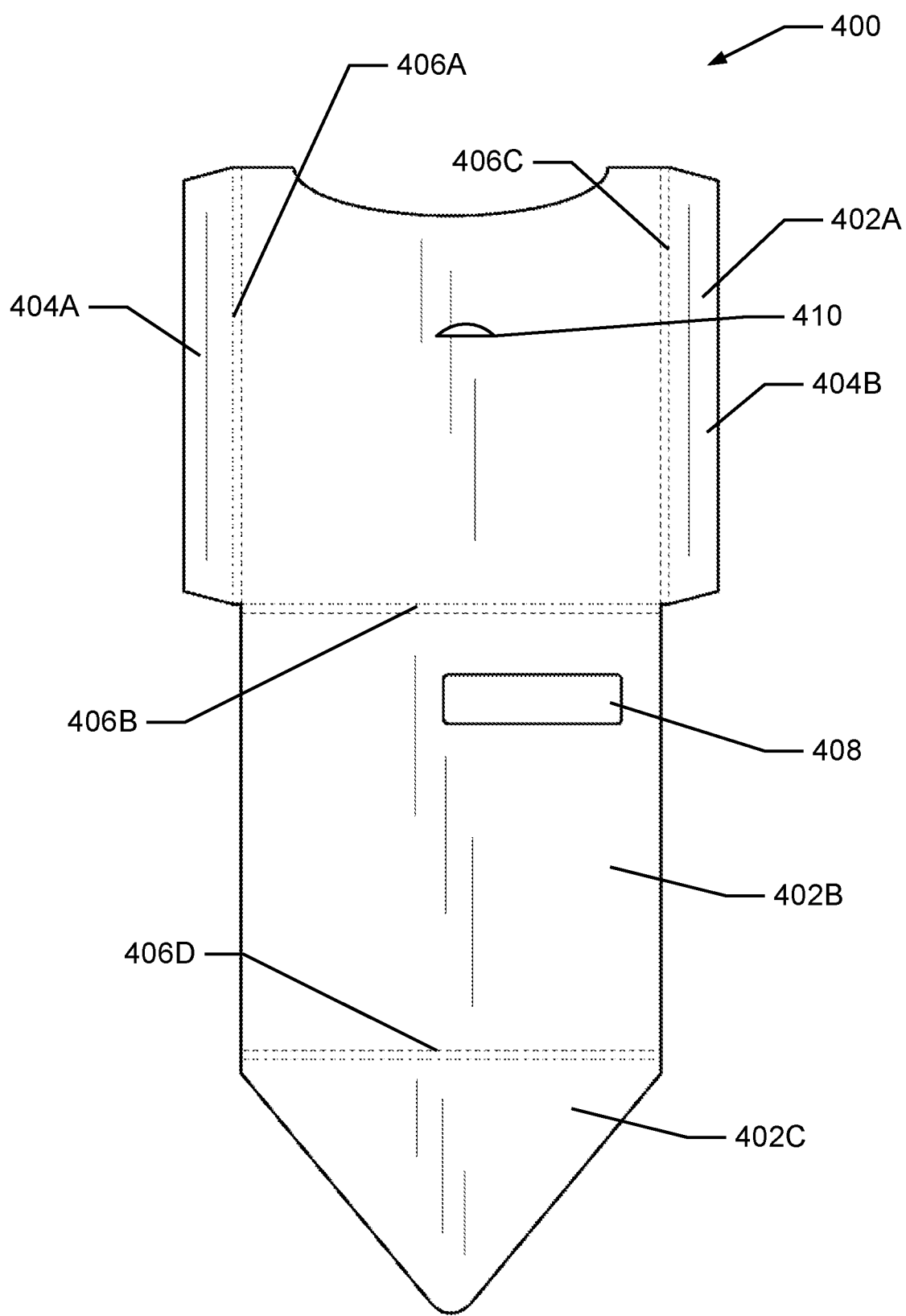
FIG. 18 is a plan view of an exterior surface of an unassembled envelope portion of a frame gift card holder according to one embodiment.
Figure 19:
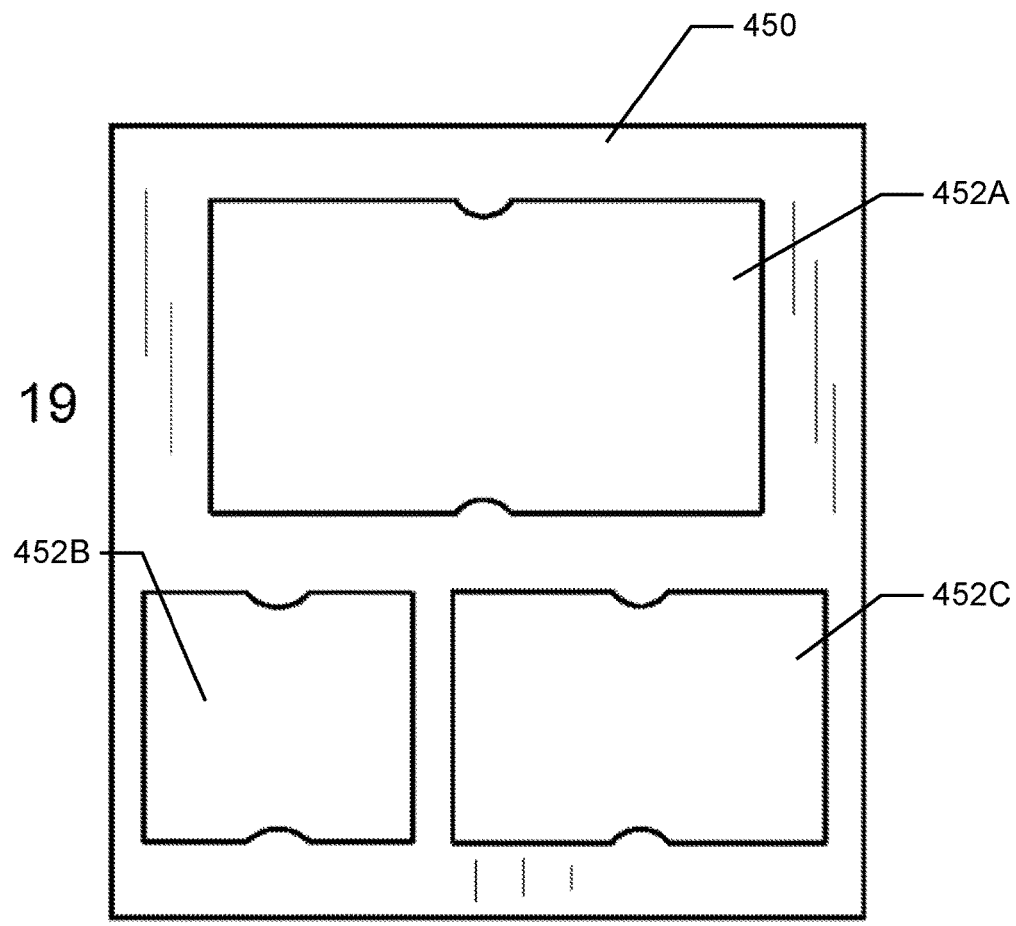
FIG. 19 is a plan view of a frame portion for a frame insert of a frame gift card holder according to one embodiment.
Figure 20A:
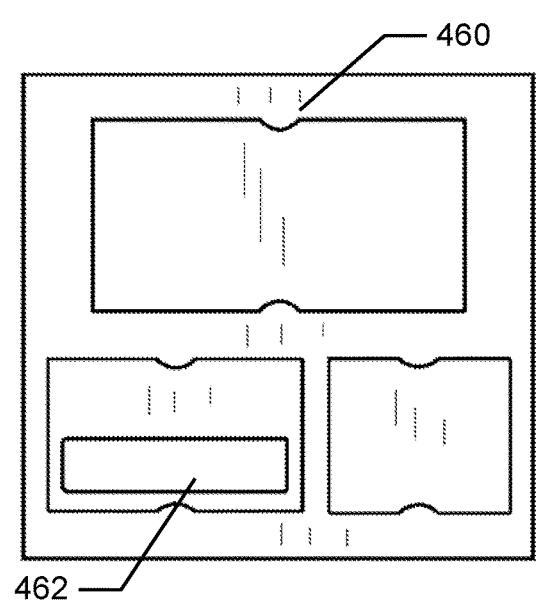
FIGS. 20A and 20B are a front plan view and a rear plan view, respectively, of a frame backer panel for a frame insert of a frame gift card holder according to one embodiment.
Figure 20B:
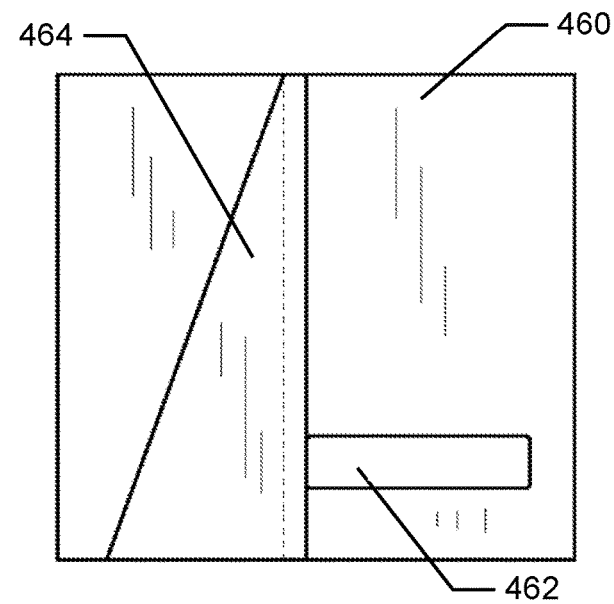
Figure 21:
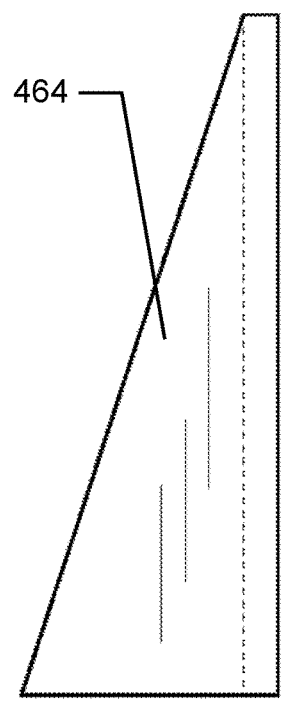
FIG. 21 is a plan view of an easel support for a frame insert of a frame gift card holder according to one embodiment.

To assemble the holder 30, the front frame 350 is affixed to the backer board 360. The insert 340 is then inserted into the sleeve 300 as shown in FIG. 14B. In one embodiment, a gift card 90 may be provided with the slide-out gift card holder 30. In another embodiment, the slide-out gift card holder 30 may be used or re-used with any gift card 90.

In various aspects, an envelope 370 may be included with the slide-out gift card holder 30. The envelope and additional tags or stickers (not shown) may be included within a separate cellophane sleeve portion (not shown). Together, the envelope and slide-out gift card holder 30 may be displayed in a retail location for sale as a single item, shown in FIG. 15, using a removable tag similar to the tag 180 shown in FIG. 4.

A Frame Gift Card Holder

An embodiment of a framed gift card holder 40 is depicted in FIGS. 16-23. The framed gift card holder 40 includes an envelope portion 400 and a removable photo frame insert 440. In one aspect, the envelope 400 may be formed from cutting and folding a planar material, such as but not limited to paper, cardstock, paperboard, foil, or cardboard. One or more sides or surfaces of the envelope portion 400 may be printed, painted, or otherwise marked with indicia. The envelope portion includes a front portion 402A, a back portion 402B, and a flap 402C, as well as tabs 404A-B. In one aspect, the front and back portions 402A-B are dimensioned to approximate the size of a typical greeting card; however, in other embodiments, other sizes may be used. The front, back, and flap portions 402A-C, respectively, and the tabs 404A-B are defined and separated by one or more folds 406A-C. In addition, the back portion 402B includes a cutout or opening 408. The cutout 408 allows a barcode or other indicia on a gift card disposed within the envelope 400 to be viewed and scanned without removing the gift card from the envelope. The envelope 400 is formed by folding the planar material along folds 406B to position the interior surface of the front portion 402A proximal to and facing the interior surface of the back portion 402B. An adhesive is applied to the tabs 404A-B which are then affixed to the interior surface of rectangular portion 402B, thereby forming the envelope that is opened at the end proximal to having the flap 402C. The flap may be folded and inserted into a slot 410 that is cut into the front portion 402A to close the envelope 400. The envelope 400 may include additional indicia and adornments, such as an area to identify the gift giver and recipient or a ribbon and bow. In addition, the envelope 400 may include a removable tab 180, shown in FIG. 4, for displaying the framed gift card holder 40 at a retail location.

In one embodiment, the removable gift card insert 440 is also made from two or more planar materials that are each marked with indicia on one surface. The insert 440 is also formed by cutting and the planar materials and affixing a front frame 450 on top of a backer board 460. In another embodiment, the insert 440 is formed from a single planar material that is cut and folded upon itself. In particular, the front frame is cut to create two or more openings 452A-C. The openings 452A-C may be generally rectangular as shown or they may be any other shape. At least one of the openings 452A-C is dimensioned to receive and hold a gift card, while the other openings are dimensioned to display one or more other items, including but not limited to photographs, greeting cards, notes, or business cards.

The backer board 460 includes a cutout or opening 462 that aligns with the cutout 408 to allow a barcode or other indicia on the gift card placed within the frame of the insert 440 to be viewed and scanned when the insert is positioned within the envelope 400. In addition, the backer board 460 may also include an easel attachment 464 that is engaged to the backer board. The easel attachment 464, may be made of the same planar material as the insert, or alternately, may be made of any other material, including plastics, that provides sufficient support to prop up the insert 440. In one aspect, the insert 440 may be placed on a surface and displayed as a photo frame, thereby augmenting the gift and further enhancing the gift giving experience.

Figure 22:
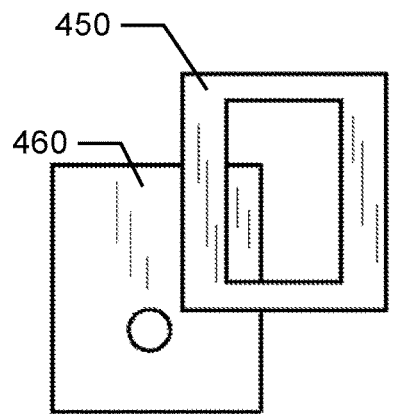
FIG. 22 is a diagram of the assembly of a frame insert of a frame gift card holder according to one embodiment.
Figure 23:
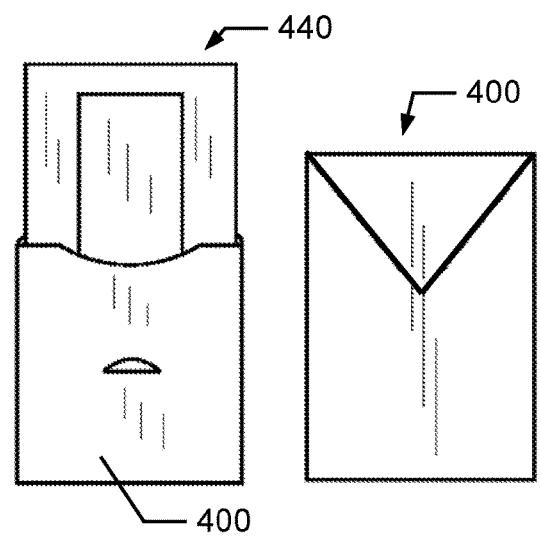
FIG. 23 is a diagram of the assembly of a frame gift card holder according to one embodiment.

To assemble the insert 440, a front frame 450 is affixed to the backer board 460, as shown in FIG. 22, and the easel attachment is attached to the backer board on the side opposite the front frame. Before being given to a recipient, the photo frame insert 440 is then inserted into the envelope 400 along with any greeting cards or notes 470, as shown in FIG. 23. In one embodiment, the greeting card 470, note or photographs may be inserted into one of the openings 452A-C of the insert 440.

Revealing Gift Card Holders

Figures 26A, 26B:
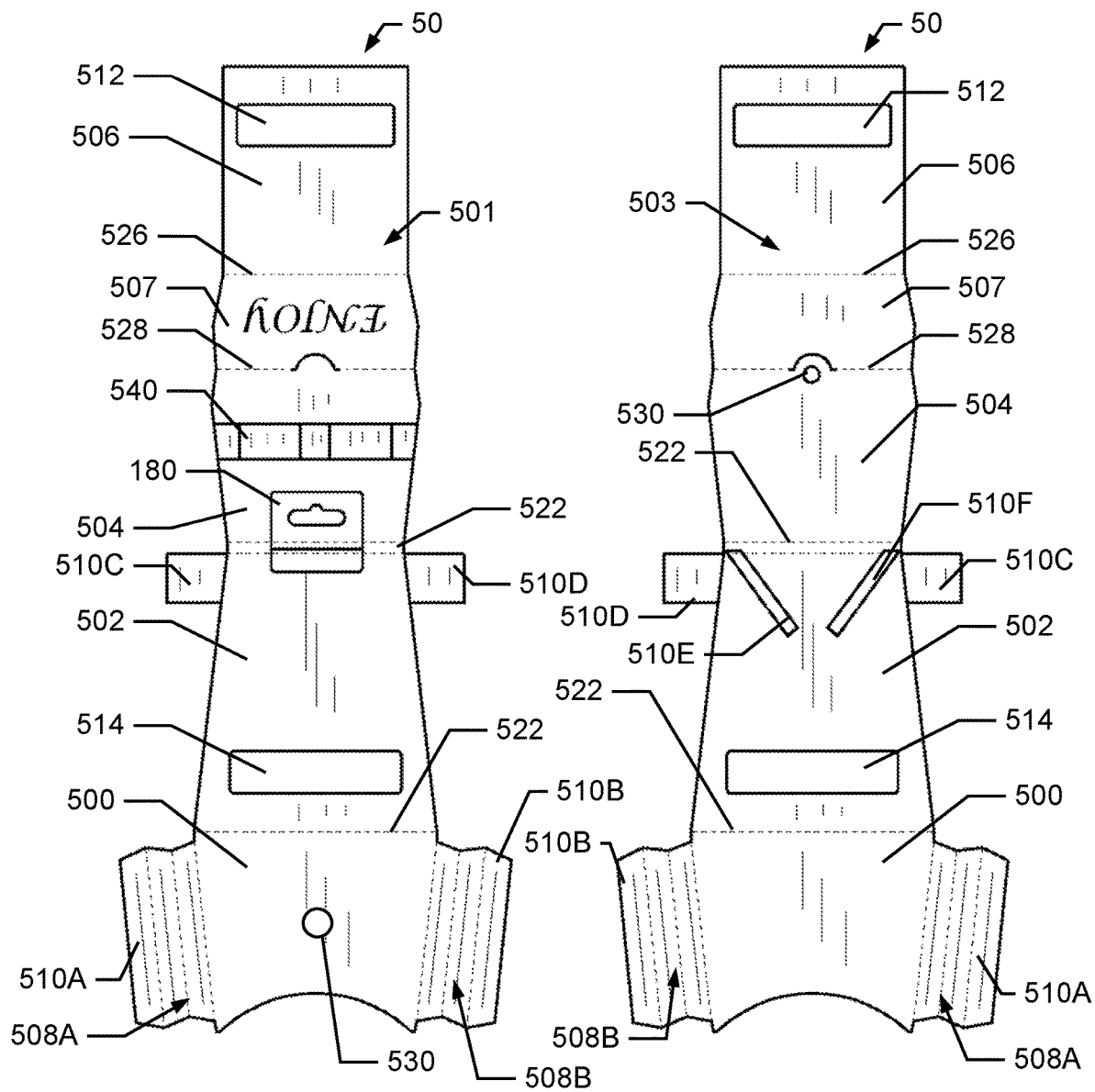
FIGS. 26A and 26B are plan views of an exterior surface and an interior surface, respectively, of an unassembled revealing gift card holder according to one embodiment.

Referring now to FIGS. 24-26B, one embodiment of a revealing gift card holder 50 is shown. In one aspect, the revealing gift card holder 50 is fabricated by cutting and folding a planar material, such as but not limited to paper, cardstock, paperboard, foil, or cardboard, into a desired shape. One or more of the external surface 501 or the interior surface 503 of the planar material, as shown in FIGS. 26A-B, may be printed, painted, or otherwise marked with graphics or indicia. Various cuts and folds may be made to the planar material to define a front panel 500, a back panel 502, a lid panel 504, a gift card panel 506, gusset panels 508A-B, and tabs 510A-F in the planar material.

In one embodiment, the front panel 500, the back panel 502, and the lid panel 504 are generally trapezoidal in shape. In one aspect, the trapezoidal portions are shaped and marked to resemble a shopping bag, and the gift card holder 50 may include a handle 554. Other shapes and configurations may also be used, including but not limited to a generally rectangular shape, as shown for the gift card panel 506. In one embodiment, the gift card panel 506 includes a sub-panel 507 that may include a message, graphics, or other indicia that is viewable by the gift recipient upon translation of the gift card panel to reveal the gift card 90.

In various aspects, both the back panel 502 and the gift card panel 506 have cutouts 512 and 514, respectively, which allow a barcode or other indicia on a gift card attached to the gift card panel to be viewed and scanned when the holder 50 is in a closed configuration, as shown in FIG. 24.

To assemble the gift card holder 50, the planar material is folded along fold 520 so that the interior surface of the front panel 500 is proximal to and facing the interior surface of the back panel 502. An adhesive is placed in the tabs 510A-B of the gusset panels 508A-B, such that the gusset panels may be affixed to the interior surface of the back panel 502. In one embodiment, once assembled the gift card panel 506 cannot be completely removed from the pocket formed by the front panel 500 and back panel 502 without folding or otherwise altering the holder 50.

The planar material is folded along folds 522 and 524 to position the gift card panel 506 within the gussets of the gusset panel 508A-B, preferably within the front must gusset of the gusset panels. Folding at folds 526 and 528, allows the lid panel 504 to overlap the front panel 500 when the gift card panel 506 is fully inserted in to the gussets as shown in FIG. 24. In one aspect, the lid panel 504 includes a closing mechanism 530, such as hook-and-loop fasteners or a removable adhesive, for removably engaging the lid panel to the front panel 500.

The tabs 510C-F provide attachment points for optional adornments such as a ribbon 540 or a bow. The gift card holder 50 may also include a removable tab 180, shown in FIG. 4, for displaying the gift card holder 50 at a retail location, or a tag 182, shown in FIG. 5, for indicating the gift giver and the recipient.

Another embodiment of a revealing gift card holder 60 is shown in FIGS. 27A-29. Similar to the revealing gift card holder 50 shown in FIGS. 24-26B, the holder 60 is fabricated by cutting and folding a planar material. One or more sides or surfaces of the planar material may be printed, painted, or otherwise marked with indicia. As shown, various cuts and folds may be made to define a front panel 600, a back panel 602, a lid panel 604, a gift card panel 606, side panels 608A-B, flaps 610A-D, and various tabs 612A-F in a single sheet of the planar material.

Figure 27A:
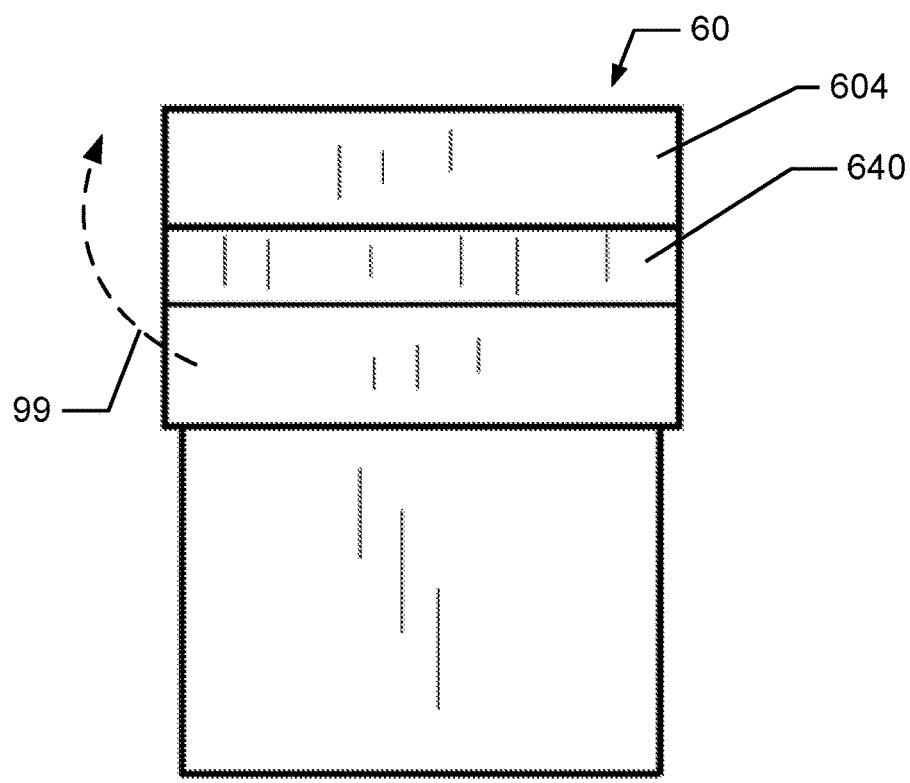
FIGS. 27A and 27B are front plan views of a revealing gift card holder in a closed and open configuration, respectively, according to one embodiment.
Figure 27B:
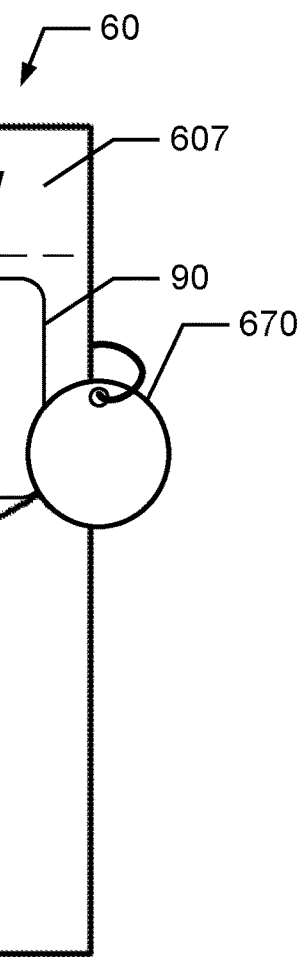

In one aspect, the front panel 600, the back panel 602, and the lid panel 604 may be generally rectangular. In addition, the flaps 610A-D may be configured such that the holder resembles a box, when assembled. In various aspects, both the back panel 602 and the gift card panel 606 have cutouts or openings 614 and 616, respectively, which allow a barcode or other indicia on a gift card 90 attached to the gift card panel to be viewed and scanned when the holder 60 is in a closed configuration, as shown in FIG. 27A. The gift card 90 in this embodiment and all other embodiments may be engaged to the various gift card panels with a removable adhesive or through one or more slits 613, as shown in FIG. 29.

To assemble the gift card holder 60, the planar material is folded along folds 620A-B so that the interior surface of the front panel 600 is facing the interior surface of the back panel 602. In one embodiment, an adhesive is placed on one or more of the flaps 610A-D, such that the side panels and the front and back panels 600 and 602, respectively, may form a box.

Figure 28A:
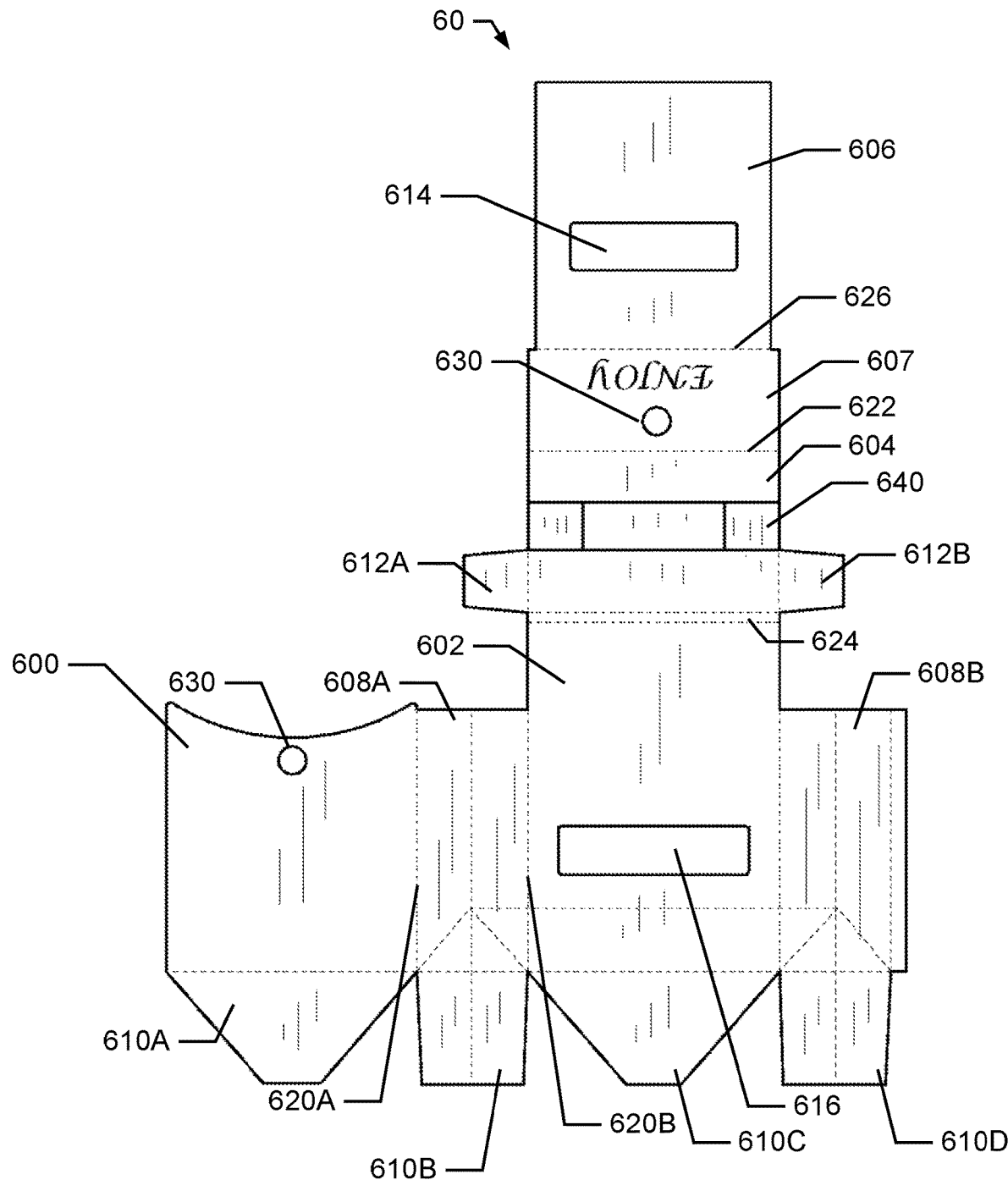
FIGS. 28A and 28B are plan views of an exterior surface and an interior surface, respectively, of an unassembled revealing gift card holder according to one embodiment.
Figure 28B:
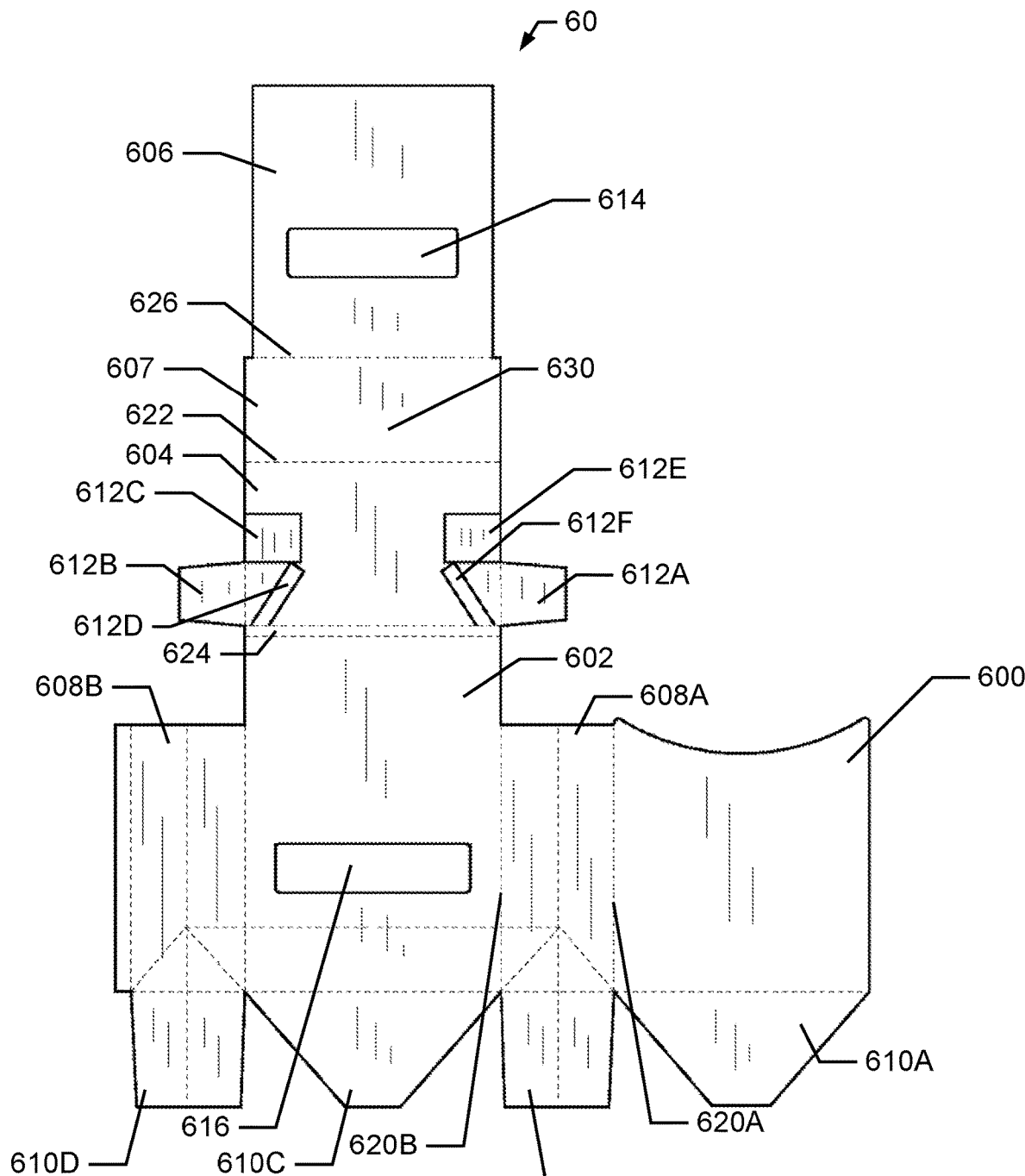

The planar material is folded along folds 622 and 624 to position the gift card panel 606 within a box formed by the front panel 600, the back panel 602, side panels 608A-B, and the flaps 610A-D, as indicated by 611. In one embodiment, the gift card panel 606 includes a sub-panel 607 that may include a message, graphics, or other indicia that is viewable by the gift recipient upon translation of the lid panel 604, as indicated by 99 in FIG. 27A, to reveal the gift card 90. Additional folding at fold 626 allows the lid panel 604 to overlap the front panel 600, when the gift card panel 606 is fully inserted into the box as shown in FIG. 27A. In one aspect, the lid panel 604 includes a closing mechanism 630, such as hook-and-loop fasteners or a removable adhesive, as shown in FIG. 28A, for attaching the lid panel to the front panel 600.

Figure 29:
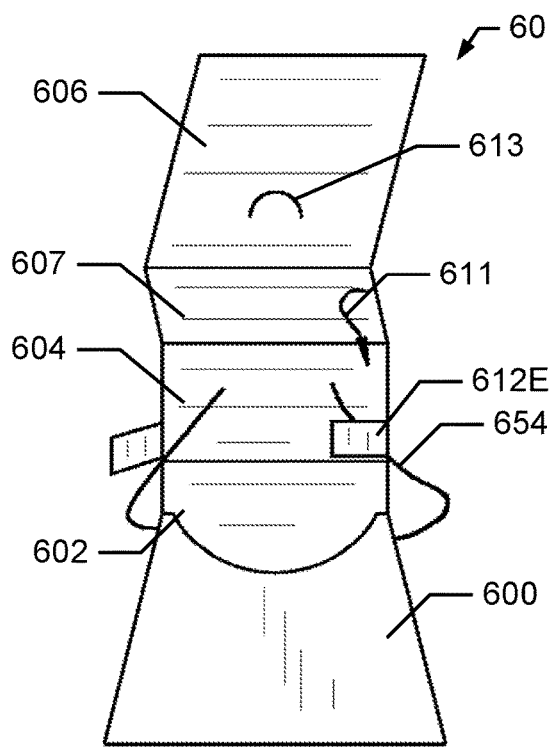
FIG. 29 is a diagram of the assembly of a revealing gift card holder according to one embodiment.

The tabs 610C-F provide attachment points for optional adornments such as a ribbon and bow 640 or handle 654, as shown in FIG. 29. The gift card holder 60 may also include a removable tab 180, shown in FIG. 4, for displaying the gift card holder 60 at a retail location, or a tag 182, shown in FIG. 5, for indicating the gift giver and the recipient.

A Bi-Fold Gift Card Holder

FIGS. 30-37 depict an embodiment of a bi-fold gift card holder 70 that includes a decorated closure band 770. The holder 70 has a general bi-fold configuration with an outer sleeve portion 700 engaged to at least one surface of an insert portion 740. In one aspect, the holder 70 is fabricated by cutting and folding one or more sheets of planar material, such as but not limited to paper, cardstock, paperboard, foil, or cardboard. Each sheet of the planar material may be printed, painted, or otherwise marked with indicia on at least one side. The outer sleeve portion is formed from a planar material that is cut and scored to form a front portion 702A, a back portion 702B, and tabs 704A-B. In one aspect, the front and back portions 702A-B, respectively, and the tabs 704A-B are defined and separated by one or more folds 706A-E. In addition, the back portion 702B includes a cutout or opening 708. The cutout 708 allows a barcode or other indicia on a gift card positioned within the holder 70 to be viewed and scanned without removing the gift card from the holder. An adhesive is applied to the tabs 704A-B which are then affixed to the interior surface of a bi-fold insert 740. The sleeve 700 may include additional indicia and adornments, such as an area to identify the gift giver and recipient or a ribbon and bow. In addition, the sleeve 700 may include a removable tab 180, shown in FIG. 4, for displaying the gift card holder 70 at a retail location.

In one embodiment, the bi-fold insert 740 is also made from two or more planar materials that are each marked with indicia or graphics on at least one surface. The insert 740 is also formed by cutting the planar materials and affixing a front frame 750 on top of a panel of a backer board 760, having a front portion 761 and a back portion 763 separated by a fold line 765. In particular, the front frame 750 is cut to create a generally rectangular opening 752, dimensioned to receive and hold a gift card. The front frame 750 may also include one or more cutouts 751 that aid the removal of a gift card disposed in the frame. The backer board 760 includes a cutout or opening 762 that aligns with the cutout 708 to allow a barcode or other indicia on the gift card placed within the frame opening 752 to be viewed and scanned when the insert is positioned within the sleeve 700. To assemble the insert 740, the front frame 750 is affixed to the interior surface 767 of the back portion 763 of the backer board 760. The sleeve 700 is also engaged to an exterior surface of the insert 740.

Figure 30:
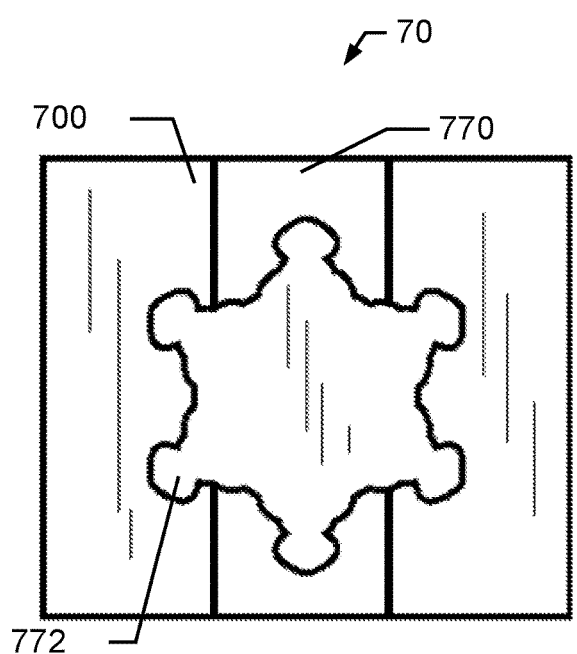
FIG. 30 is a plan view of a bi-fold gift card holder in a closed configuration according to one embodiment.
Figure 31A:
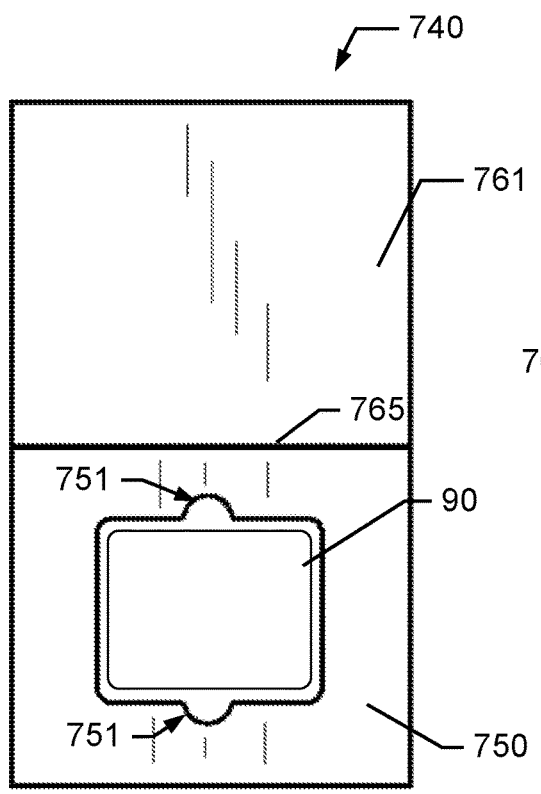
FIGS. 31A and 31B are a front plan view and a rear plan view, respectively, of a bi-fold gift card holder in an open configuration according to one embodiment.
Figure 31B:
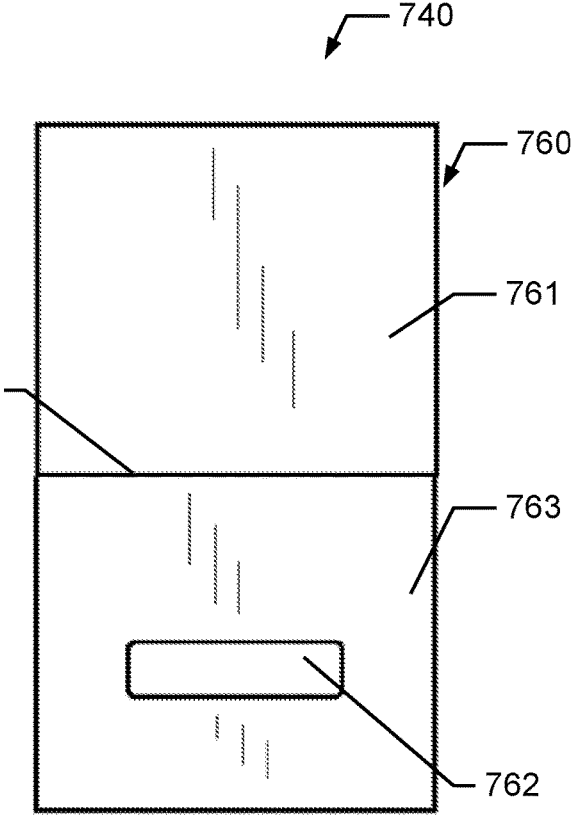
Figure 35A:
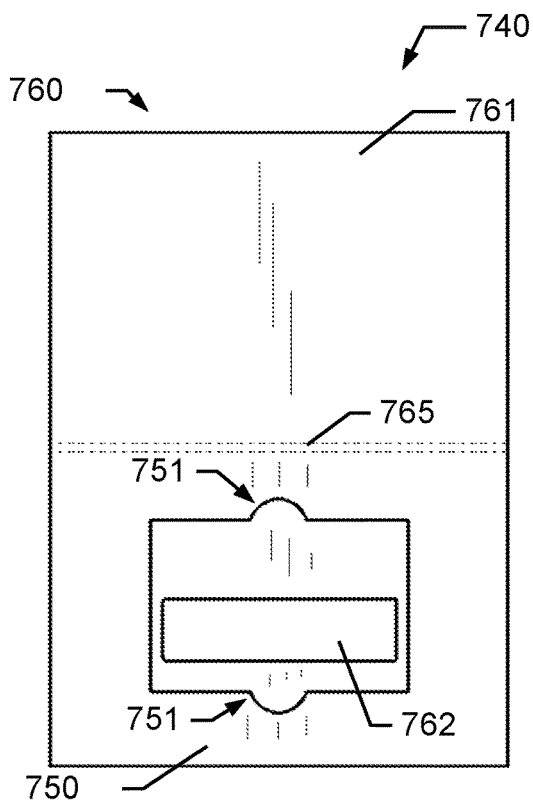
FIGS. 35A and 35B are a front plan view and a rear plan view, respectively, of an assembled bi-fold insert portion of a bi-fold gift card holder according to one embodiment.
Figure 35B:
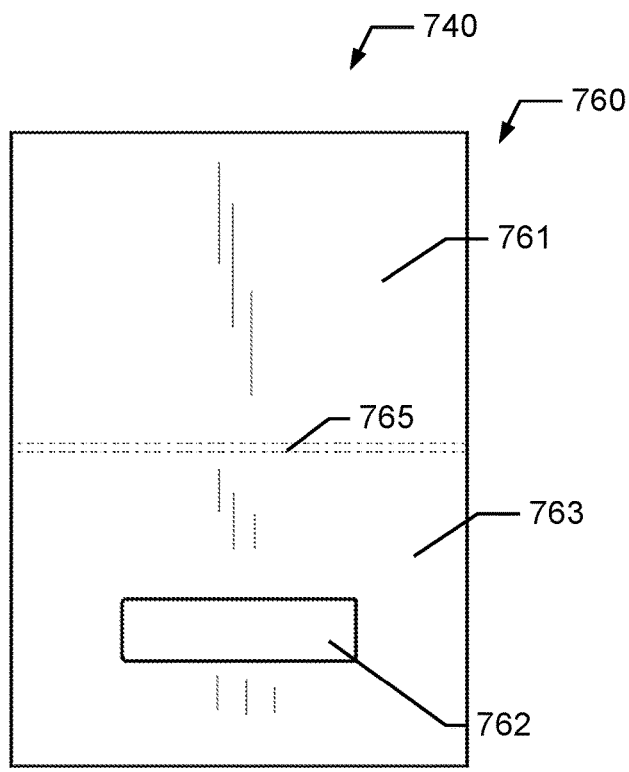
Figure 36:
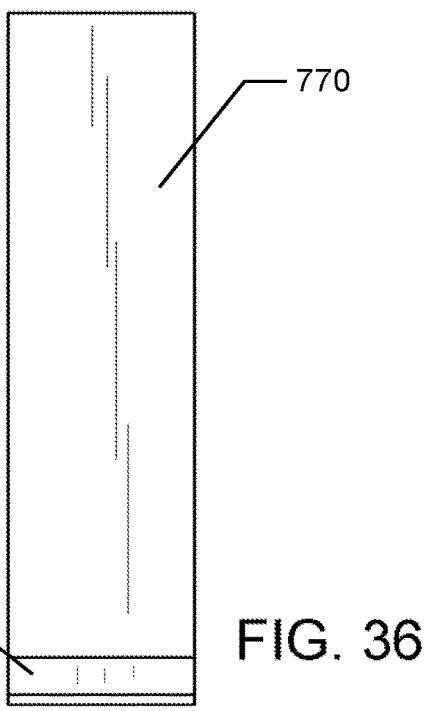
FIG. 36 is a plan view of a closure band of a bi-fold gift card holder according to one embodiment.
Figure 37:
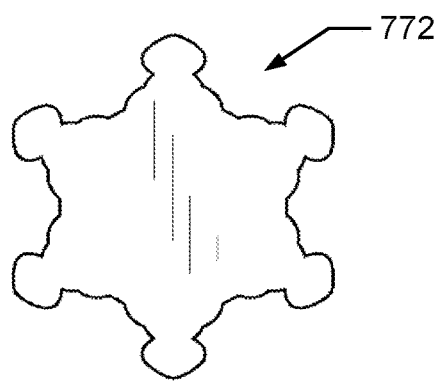
FIG. 37 is a plan view of a decorative element for a closure band of a bi-fold gift card holder according to one embodiment.
Figure 38A:
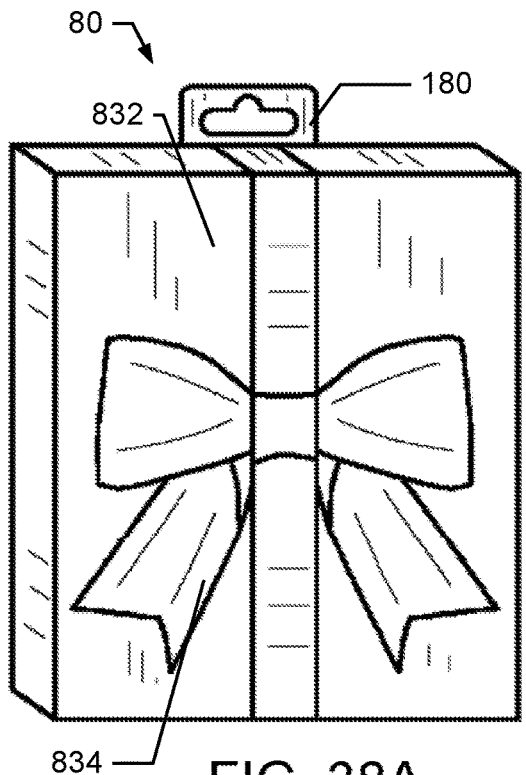
FIGS. 38A and 38B are a front plan view and a rear plan view, respectively, of a gift box gift card holder according to one embodiment.
Figure 38B:
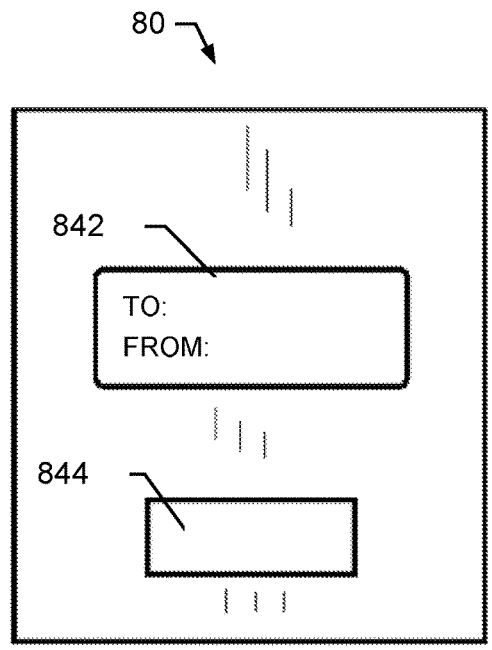
Figure 38C:
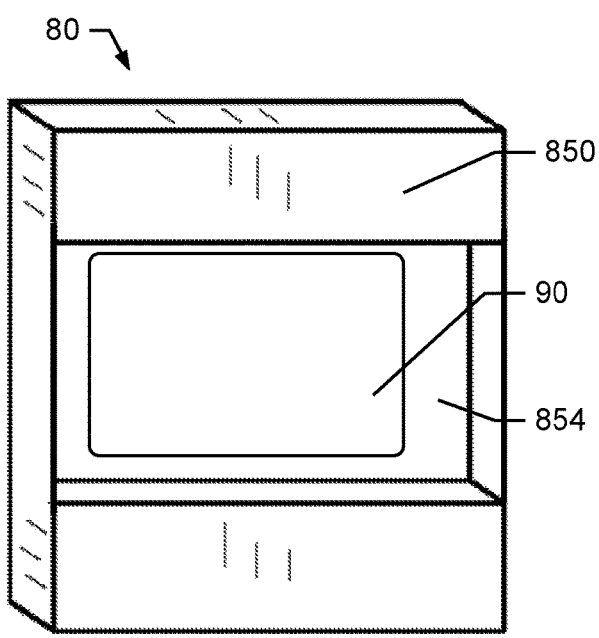
FIG. 38C is a perspective plan view of a gift box gift card holder with the lid removed according to one embodiment.
Figure 39:
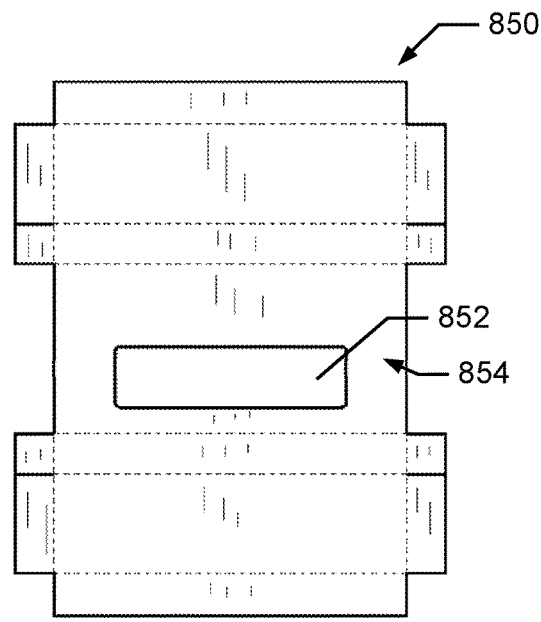
FIG. 39 is a plan view of an unassembled tray of a gift box gift card holder according to one embodiment.

In various aspects, a band 770, shown in FIGS. 30 and 36, for holding the gift card holder 70 closed in a folded configuration, is engaged to the holder. The band 770 may be fabricated as a continuous loop of material; alternatively, the band may be a strip of material that is adhered or otherwise attached to itself to form the band. In one embodiment, the band 770 is a planar material, such as paper, cardstock, or fabric, among others, that includes an adhesive 771 for forming the continuous loop. In one aspect, the band 770 may include one or more additional adornments 772. In various aspects, the adornments 772 and indicia for the gift card holder 70 may vary in accordance with the purpose of the gift, the holiday, or season. For example, the adornment may have the general shape of a snowflake for giving a gift during winter.

A Gift Box Gift Card Holder

FIGS. 38A-42 depict another embodiment of a gift box gift card holder 80. In this embodiment, the gift box gift card holder 80 is generally box-shaped with a bottom portion 800 and a lid portion 802. The bottom portion 800 and lid portion 802 may be engaged to decorative covers 840 and 830, respectively, which include graphics or indicia. In one embodiment, the graphics and indicia may be applied directly to the bottom portion 800 and the lid portion 802. The holder 80 may also include a tray 840 within the box to hold and display a gift card placed or attached thereon.

The bottom portion 800 and a lid portion 802 are fabricated from a planar material that is cut and scored to define a respective bottom panel 810 including a cutout 812 and a top panel 814. Each portion 800 and 802 also includes sidewalls 816A-D and 818A-D, respectively, which are formed from the planar material. The sidewalls 816A-D and 818A-D may be folded inward to provide structure to the box. In one aspect, sidewalls 816A and 816C include notches 820A-B to grip and remove the lid portion 802 from the bottom portion 800 after assembly.

The decorative liners 830 and 840 are similarly formed from a planar material. One or more sides or surfaces of the planar materials for the decorative liners 830 and 840 are printed, painted, or otherwise marked with indicia. In one aspect, the markings are designed to give the appearance of wrapping paper 832 and a bow 834. One or both liners 830 and 840 may include an area 842 for indicating the gift giver and the recipient. The decorative liner 840 for the bottom portion 800 may also include a cutout 844 that aligns with the cutout 812 of the bottom panel 810 to allow a barcode or other indicia on a gift card placed in the holder 80 to be viewed and scanned when the holder is in a closed configuration, as shown in FIG. 8E. The decorative liner 840 may also be affixed with a removable tab 180, shown in FIG. 4, for displaying the gift card holder 80 at a retail location.

The tray 850 may be formed from a planar material that is cut and folded to fit within the bottom portion 800. The tray 850 includes a central portion 854 that is proximal to the bottom portion 800 of holder 80, when the tray is folded and assembled. In one embodiment, the central portion 854 is adhered to the interior surface 801 of the bottom portion 800. The central portion 854 of the tray 850 also defines a cutout or opening 852 that is aligned with the cutouts 812 and 844 to allow the barcode or other indicia on the gift card to be viewed and scanned without removing the card from the box 80. In various aspects, the tray 850 includes markings and indicia that may correspond to the gift giving occasion, holiday, or season.

For each embodiment, a gift card 90 may be included with the gift card holders 10-80. In various other embodiments, the gift card holders 10-80 may be used or re-used with any gift card 90, including those purchased separately from the purchase of the gift card holder.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A device configured to receive a gift card comprising:
 a sleeve portion including a first cutout;
 an insert portion, fully removable from the sleeve portion, configured to receive a gift card, wherein the insert portion including a second cutout and a third cutout;
 wherein the insert portion contains a wider section and a narrower section;
 wherein the wider section of the insert portion is of greater width than the sleeve portion and forms an upper gripping panel;
 wherein the narrower section of the insert portion is configured to fit within the sleeve portion;
 wherein the second cutout of the insert portion aligns with the third cutout of the insert portion by folding;
 wherein the narrower section of the insert portion is slidably engaged to the sleeve portion such that the gift card is concealed within the sleeve portion when the insert is fully inserted into the sleeve portion and the first cutout is aligned with the second cutout and third cutout while securing the gift card in place; and,
 wherein an indicia of the gift card to be inserted in the device is visible through the first cutout, second cutout, and third cutout.

2. The device of claim 1, wherein the sleeve portion is adorned by a bow.

3. The device of claim 1, wherein the sleeve portion is configured to simulate an appearance of a gift box.

4. The device of claim 1, wherein the insert is a frame.

5. The device of claim 1, wherein the insert portion presents a handle at a top end of the wider section as to resemble of a gift bag.

6. A device configured to receive a gift card comprising:
 a sleeve portion comprising, a front, a back having a first cutout, and a flap;
 an insert portion, fully removable from the sleeve portion, configured to receive a gift card, wherein the insert portion comprises a front, a back with a second cutout, and a front frame;
 wherein the insert portion contains a wider section and a narrower section;
 wherein the wider section of the insert portion is of greater width than the sleeve portion and forms an upper gripping panel;
 wherein the narrower section of the insert portion is configured to fit within the sleeve portion;

wherein the narrower section of the insert portion is slidably inserted into the sleeve portion such that the first cutout is aligned with the second cutout while securing the gift card in place; and, wherein an indicia of the gift card to be inserted in the device is visible through the first cutout and the second cutout.

7. The device of claim 6, further comprising a hangtag.

* * * * *